United States Patent

Shin et al.

[11] Patent Number: 5,808,914
[45] Date of Patent: Sep. 15, 1998

[54] TABLE ALLOCATING APPARATUS AND METHOD

[75] Inventors: Kil-Ho Shin; Kenichi Kobayashi; Akira Suzuki, all of Kanagawa, Japan

[73] Assignee: Fuji Xerox Co., Ltd., Tokyo, Japan

[21] Appl. No.: 418,400

[22] Filed: Apr. 7, 1995

[30] Foreign Application Priority Data

Apr. 11, 1994 [JP] Japan ..................................... 6-071909

[51] Int. Cl.⁶ .................................................. G06E 17/30
[52] U.S. Cl. ......................... 364/578; 395/770; 395/600; 364/943
[58] Field of Search ..................................... 395/770, 600, 395/500; 364/943, 943.44, 943.5

[56] References Cited

U.S. PATENT DOCUMENTS

| | | | |
|---|---|---|---|
| 5,438,512 | 8/1995 | Mantha et al. | 364/419.1 |
| 5,455,945 | 10/1995 | VanderDrift | 395/600 |
| 5,459,827 | 10/1995 | Allouche et al. | 395/148 |
| 5,557,787 | 9/1996 | Shin et al. | 395/600 |

FOREIGN PATENT DOCUMENTS 5-151208  6/1993  Japan .

*Primary Examiner*—Kevin J. Teska
*Assistant Examiner*—A. S. Roberts
*Attorney, Agent, or Firm*—Finnegan, Henderson, Farabow, Garrett & Dunner, L.L.P.

[57] ABSTRACT

A table allocating apparatus for producing a layout of a table. In the apparatus, both of a linear equation for representing a column width of a table or a row height thereof by employing a parameter, and a section constraint condition corresponding to a combination of conditions for satisfying the parameter in order that a height or a width of a rectangle becomes constant when each of texts arranged in a table item column is allocated are set, then a layout evaluation formula expressed by the linear equation with employment of the parameter and indicative of better states of a layout for each of the section constraint conditions is calculated. Further, such a linear programming problem that the section constraint condition is used as a restriction condition and the layout evaluation formula corresponding to each of the section constraint conditions is used as an objective function is solved, thereby obtaining a set of an optimum layout evaluation value and a parameter corresponding to the optimum layout evaluation value, or an infeasible solution of the problem, and when the set of the optimum layout evaluation value and the parameter corresponding thereto is acquired, a set of the optimum layout evaluation value and the parameter corresponding thereto based on the acquired result among all of the linear programming problems are retrieved, whereby a table layout is determined based upon the set of the optimum layout evaluation value and the parameter corresponding thereto.

10 Claims, 21 Drawing Sheets

| This sentence is a relatively long one. | This is short. |
|---|---|
| Write briefly. | Reading too long sentences is difficult and causes waste of time. |

| This sentence is a relatively long one. | This is short. |
|---|---|
| Write briefly. | Reading too long sentences is difficult and causes waste of time. |

FIG. 3 (A)

| This is a relatively long one. | This is short. |
|---|---|
| Write briefly. | Reading too long sentences is |

FIG. 3 (B)

\ begin { tabular } { l 1 l 1 l }
\ hline
This is a relatively long one. &
This is short. \\
\ hline
Write briefly. &
Reading too long sentence . is difficult
and causes waste of time. \\
\ hline
\ end { tabular }

FIG. 4 (A)

| This is a relatively long one. | This is short. |
|---|---|
| Write briefly. | Reading too long sentences is difficult and causes waste of time. |

FIG. 4 (B)

\ begin { tabular } { | p { 1in } | p { 1in } | }  
\ hline  
This is a relatively long one. &  
This is short. \ \  
\ hline  
Write briefly. &  
Reading too long sentence is difficult  
and causes waste of time. \ \  
\ hline  
\ end { tabular }

FIG. 5

| Subject | Excellent | Good | Average | Damned |
|---|---|---|---|---|
| Mathematics | × | | | |
| Physics | × | | | |
| Chemistry | × | | | |
| History | | | | × |

This is an example of a box.

This is an
example of
a box.

FIG. 10

| CONJUGATION | CLASSIFICATION BASIS | | NAME OF SPEECH PART |
|---|---|---|---|
| NON-CONJUGATED FORM | ONE CONSTITUTES A SUBJECT (SUBSTANTIVES) | | NOUN |
| | ONE DOES NOT CONSTITUTE A SUBJECT | BEING MODIFIER | ADVERB, ATTRIBUTIVE FORM |
| | | BEING NOT MODIFIER | CONJUNCTION, EXCLAMATION |
| CONJUGATED FORM | ONE CONSTITUTES A PREDICATE (CONJUGATED ENDINGS) | | VERB, ADJECTIVE, ADJECTIVE VERB |

TABLE ALLOCATING APPARATUS AND METHOD

BACKGROUND OF THE INVENTION

1. Field of the Invention

The present invention relates to a table allocating apparatus for producing a layout of a table.

2. Description of Related Art

Very recently, table forming functions are necessarily required in document processing systems. In the conventional simple document processing systems, a user draws a ruled line and arranges a text into the respective cells segmented in a table. In such simple document processing systems, when the text cannot be stored into the relevant cell or this cell finally owns large empty space, the user should redraw the ruled line so as to correct the shape of this table. As a result, the user must repeat trial and error and therefore must waste time.

To form a table, a decision is made in a height of a row of this table and a width of a column thereof, and the row of a text to be set to a cell is adjusted to be fitted to the width of the column. Both the row height and the column width of the table may be determined based on various conditions such as dimensions of the text to be allocated and sizes of the entire table. At this time, for instance, when the line of the text is folded to be fitted to the width of the column, there are some possibilities that the heights of the rows become too high or too low. Conversely, for example, when the number of characters under which the line is folded or adjusted to be fitted to the heights of the row is determined, there are certain possibilities that the widths of the columns become too narrow, or too wide. Under such circumstances, row heights and column widths of a table, and also line adjustments of a text should be determined, taking into account of the overall balance.

In the conventional table forming system using the ruled line, since users consider these elements and decide the necessary elements to form the tables, some of them could not form their desired tables, or should require long table forming time and pay great efforts. Thus, if heights of rows in tables and widths of columns thereof, and further line adjustments of texts can be automated, then users may be released from such cumbersome works to form the tables. Then, when no specific requirement is made in a layout, an allocation of a table can be completely automated, so that users can simply form such an easily observable table with a better layout.

Although there is a merit when the table allocation can be automated, no such document processing system could now be developed which owns two functions, namely a function for automatically setting row heights of a table and column widths thereof, and another function for automatically adjusting lines of a text. For instance, in J-Star (registered trademark) and LaTeX document processing systems, the user must designate the concrete numeral values (fixed width) used as the width of the column (horizontal interval) so as to properly adjust to lines of the text. In Interleaf 5 (trade name) document processing system, two methods are provided, i.e., one method for designating the fixed width of the column by the user, and another method for designating the equal width. When the equal width is designated for one or more columns, these column widths are automatically calculated in order to maintain the designated ratio. However, also in this case, the entire table owns the maximum width which is determined by the fixed margin at pages and by the fixed margin at the table. As a result, actually, the width of the column to which the equal width is designated is not defined by the text appearing in the item column, but predetermined.

As described above, when the text is line-adjusted in the conventional document processing system, the widths of the columns must be previously determined. In other words, both the column width and the line adjustment of the text could not be automatically determined, depending on the amount of the text.

In the conventional document processing systems, the reason why both of the automatic determinations about the row height and column width of the table, and the automatic line adjustment of the text could not be simultaneously achieved is given by the technical aspects as follows:

Assuming now that the horizontal interval (namely, width of column) is predetermined, there is no difficulty that the automatic decision of the vertical interval (height of row) and also the automatic line adjustment of the text are commonly satisfied. For example, in the above-described conventional document processing systems of J-Star, LaTeX, and Interleaf 5, this function could be realized based on the below-mentioned method. First, the line adjustment of the text is calculated in order to store the text within a predetermined width (summation of widths of columns with which item columns intersect) of item columns by injecting the text into the item columns. Based on the calculated line adjustment, the height of the text is calculated. The minimum vertical interval is calculated in order that the height of the item column becomes higher than the height of the text to be injected. As a consequence, when the horizontal interval is predetermined, both of the determination about the vertical interval and the line adjustment of the text can be automatically performed.

Here, while the vertical interval is calculated, the area occupied by the entire table and the peripheral length of the table can be made minimum by selecting the minimum vertical interval to satisfy a predetermined condition. These items are standards or criterions to measure compactness on the table surface. In such conventional document processing systems as J-Star and LaTeX, compactness of the table layout is employed as the evaluation standard of the table layout quality.

On the other hand, it is not so easily achieved that all of the column width/row height and the line adjustment of the text are automatically determined while the compact table layout can be maintained in the case that the above-described column width is predetermined. FIGS. 2(A) to 2(C) are explanatory diagrams for showing various shapes of tables. For instance, the tables shown in FIGS. 2(A) to 2(C) are such simple tables having 4 item columns. Symbols d1 and d2 represent widths (horizontal intervals) of first and second columns. It is assumed that these horizontal intervals d1 and d2 may be freely selected to be desirable values under such a limitation of d1+d2=d. It should be noted that symbol "d" indicates a constant determined by the width of a page and the like. A relatively long text is allocated to an upper left item column and a lower right item column, whereas a relatively short text is allocated to a lower left item column and an upper right item column.

It is now assumed that d1=d2=d/2. Then, such a table as shown in FIG. 2(A) is obtained. Considering now to the first row, since the text allocated to the left item column is longer than that allocated to the right item column, this text is folded with having many lines. As a consequence, the height of the first row is determined based on the line number of the text located at the upper left column. Now, in order that the first row is made more compact while reducing the height of the first row, the width d1 of the first column is made large and the line-folded number of the upper left text must be lowered. On the other hand, considering now to the second row, the long text is allocated to the right item column rather than the left item column. As a consequence, to reduce the row height, the width d1 of the first column must be conversely reduced.

As described above, in order to improve compactness of a table, it is not so readily determined to increase the width d1 of the first column, or to decrease it. That is to say, increasing and decreasing of the horizontal interval would give contradictory effects to layout compactness in the respective rows.

There is a difficulty to determine an optimum horizontal interval, namely such a horizontal interval capable of representing a table with the highest compactness while compromising these contradictory effects. None of these document processing systems of J-Star, LaTeX, and Interleaf 5 can automatically produce the optimum table layout in such an example as shown in FIGS. 2(A) to 2(C). This type of difficulty would be considerably emphasized when such tables are allocated, namely, a table having large numbers of item columns, a table having a complex shape which is not a cross-shape, i.e., a table with item columns bridging a plurality of rows/columns.

A concrete description will now be made how to determine the interval and how to process the line adjustment of the text in the conventional document processing systems, e.g., J-Star, Interleaf 5 and LaTeX.

In J-Star system, decisions of the line adjustment and the row height (vertical interval) are automatically supported by the system. However, the column width (horizontal interval) must be varied by the user himself. When a table is formed in the J-Star system, the property sheet can be opened by designating the column of the table (array of item columns in the vertical direction). The property sheet is such a window used to designate a document element and a property thereof and to confirm this property. In the J-Star system, the user opens the property sheet to designate various attributes, so that the characteristic of the document is determined. In the property sheet of the column, there is a field called as a "width" used to designate the width of the column. The user sets the value to the "width" field, so that the width of the column is determined. When the user does not set the value into the "width" field, the system automatically sets the default value. As described above, the horizontal interval of the table may be designated by the user, or the value (constant) of default may be designated by the system in the J-Star system. That is, the horizontal interval of the table is not automatically varied in response to an amount of a text injected into to the item column.

When the text is entered into the item column of the table, the text is automatically folded in order that this text does not exceed the designated item column's width (summation of column widths). At this time, the height of the row is increased in order that this increased row height can display the folded text. Either when the text is excessively folded, or conversely when the necessary line folding is not performed and thus the resultant shape of the table is deteriorated, the user must again open the property sheet to redesignate the width of the column.

Also, in the Interleaf 5 system, the decisions of the line folding (adjustment) and the row height (vertical interval) are automatically supported by the system. However, changing of the column width (horizontal interval) must be performed by the user himself, which is similar to the J-Star system. Also, in this Interleaf 5 system, when a table is formed, the column (arrangement of item columns in the vertical direction) of the table is designated so that the property sheet can be opened. The user can designates whether the width of the column is designated as a "fixed width", or an "equal width" on the property sheet. When the "fixed width" is designated, the width of the column is designated as the concrete value in combination with this fixed width. In case that the user does not change the concrete width value of the column, the default value calculated by the system is applied. In case that the equal width is designated, the "unit number" is designated in combination therewith. The unit number is used to determine a ratio of the width of the column to which the equal width is designated.

When a designation is made of the equal width with respect to at least one column, the system first calculates the maximum width allowable to the overall table based on the page margin and the table margin. Next, the summation of the widths of the columns to which the fixed widths are designated is subtracted from this maximum width, so that the maximum width allocated to the column with the equal width is calculated. Finally, the calculated maximum width is distributed to the respective columns in such a manner that this maximum width is in proportion to each of the respective designated unit numbers. As a result, the actual widths of the columns are calculated.

As described above, even when the column is designated as the "fixed width", or "equal width", the width of the column is preset, and is not automatically changed in accordance with the amount of the text which is injected into the item column. This technical difficulty is similar to that of the J-Star system.

In accordance with the program of the LaTeX system, the column width (horizontal interval) is automatically determined, depending upon the length of the text. However, in this case, all the texts in the respective item columns are allocated to 1 line. On the other hand, to perform the automatic line folding operation of the text, the user must clearly designate the horizontal interval. FIGS. 3(A) and 3(B) are explanatory diagrams for representing an example of a table which is formed by not designating a horizontal interval by way of the LaTeX system. A table shown in FIG. 3(A) is formed by a statement indicated in FIG. 3(B).

The information concerning the column of the table is described in the medium bracket subsequent to "begin {tabular}". In this example, it is designated as |1|1| in the medium bracket. The control character "|" indicates drawing the ruled line. This drawing represents that the vertical ruled lines are drawn at the left end of the first column, the boundary between the first column and the second column, and the right end of the second column. Also, the control character "1" indicates that the texts injected into the item columns of the respective columns are allocated to the left corner. As the information about the column of the table, only two sorts of this information are stated. As described above, when the width of the column (horizonal interval) is not designated, the text injected into the column is not folded, but surely allocated into one row. In other words, in the program of the LaTeX system, the maximum value of the length of the text injected into the column is calculated, and the value obtained by adding the margin to this maximum value is used as the width of this column. As shown in FIG. 3(A), although the width of the second column is not sufficient to allocate the lower right text to one row, since the text is not permitted to be line-folded into a plurality of lines, only a portion of the text is displayed.

FIGS. 4(A) and 4(B) are explanatory diagrams for showing an example of a table formed by designating a size of a horizontal interval by way of the LaTeX system. The widths of the respective columns are designated as approximately 25.4 mm (=1 inch) by the statement |p{lin}|p{lin}| in the medium bracket subsequent to "begin {tabular}" shown in FIG. 4(B). As a result, as indicated in FIG. 4(A), the upper left text is automatically folded as 3 lines, and the lower right text is automatically folded as 7 lines. In the system, the minimum row height required to display the folded text is calculated and used as the vertical interval.

As to a layout of a table, there is a "table layout for satisfying a constat constraint condition by a column width and a row height" as a user demand widely recognized. This may cause such a factor that the column width and the row height merely determine the layout quality of the table, but also may cause such a fact that the meaning portion of the table is transferred by way of such a visual effect as balances in the rows/columns in the table. FIG. 5 is an explanatory diagram of showing an example of a table requested by a user. In the table shown in FIG. 5, this table is constructed of such a layout that the second and subsequent columns own the equal widths which are longer than the length of the text allocated to the items. This implies not only the good appearance of the table but also other aspects. That is to say, such a fact that the columns titled as "Excellent", "Good", "Average" and "Damned" are the evaluation values based on the same evaluation axis is represented by that the widths of the corresponding columns are equal to each other.

To realize these demands issued from the user in the J-Star and LaTeX systems, such concrete values as the row heights and column widths must be designated by the user himself so as to satisfy the constraint conditions caused by the user's demands. In the example shown in FIG. 5, the widths of the second and subsequent columns should be designated to be the same value by the user himself. Moreover, the user must select proper designated values in order that the texts in the columns do not overflow, but the widths are not widened as compared with the amount of the texts. When the width of the column is varied, all of the second and subsequent columns should be varied.

In the Interleaf 5 system, these user demands may be partially satisfied. In the example shown in FIG. 5, it can be clearly designated that the second and subsequent columns own the same widths. Moreover, the table margins should be designated by the user in order that the width of the column owns the proper values to the text. To satisfy the more constraint condition, the user is required to directly designate the column width in a similar manner to the J-Star and LaTeX systems.

Generally speaking, it is known that most of the user demand related to a layout of a table may be expressed in forms of a linear equation and a linear inequality concerning a column width and a row height. Assuming now that $X_1$, $X_2$, ..., $X_n$ represent widths of the respective columns of the table constituted of n columns, some examples related to the layout condition are indicated as follows:

Condition (1): The entire width of the table should be equal to "w":

$$X_1 + X_2 + \ldots + X_n = W$$

Condition (2): The entire width of the table should be selected between $w_1$ and $W_2$:

$$w_1 \leq X_1 + X_2 + \ldots + X_n \leq w_2$$

Condition (3): The widths of the columns from the second column to the (n-1)th column should be selected to be equal to each other:

$$X_2 = X_3 = \ldots = X_{n-1}$$

Condition (4): The width of the first column should be selected to be two times to three times wider than the widths of the second and subsequent columns:

$$2*X_2 \leq X_1 \leq 3*X_2$$

$$2*X_3 \leq X_1 \leq 3*X_3$$

...

$$2*X_n \leq X_1 \leq 3*X_n$$

Among these examples, the example shown in (1), for instance, it is designatable by the table margin of the Interleaf 5 system. Also, the example shown in (3) may be designated by the equal width of the Interleaf 5 system. However, as to other examples, the user must set the concrete numeral values of the column widths so as to satisfy the respective conditions in the conventional document processing systems.

The optimum solution to satisfy the linear equation indicative of such user's demands is found out so that the table with the optimum layout can be formed. As a method capable of obtaining the optimum solution for satisfying a plurality of linear equations, there is the linear programming. According to the present invention, the linear programming is employed so as to solve the above-described problems.

As an example in which the linear programming has been applied to the table allocating process, there is a publication written by Beach "Sitting Tables and Illustrations with Style", PHD thesis, University of Waterloo, Waterloo, Ontario, Canada in 1985. This publication describes that the conditions where the text is left-flushed, centering, and right-flushed with the respective item columns, and also such a condition where the reference points of the plural texts are arranged on the alignment line, namely the reference line alignment may be expressed by the linear equation and the linear inequality. As a result, this publication indicates that the table allocation process can be realized with employment of the linear programming.

However, the above-described publication does not make any effective consideration about the automatic line folding process of the text. The algorithm explained in this publication is effective only when the respective texts are not folded. More correctly speaking, this algorithm can be effectively executed only when the dimension of the allocation box corresponding to the rectangular region occupied by the text has been defined prior to the allocation process.

The major purpose of the table allocation process described in the publication is to represent that a table allocation process is feasible such that the texts contained in the table are aligned and arranged in accordance with the designation, especially a plurality of texts are arranged on the basis of the alignment line. That is, the essential demand is solved in the tables in European and American countries. As a consequence, no resoluting method has been proposed as to such a table layout that lines of a text are automatically adjusted.

SUMMARY OF THE INVENTION

The present invention has been made in attempt to solve the above-explained problems, and therefore, has an object to provide a table allocating apparatus and method capable of producing a table layout for satisfying the optimum layout basis while intervals (row height, column width) between horizontal ruled lines of a table and vertical ruled lines thereof are automatically determined and lines of a text in an item column are automatically adjusted, or folded. In other words, according to the table allocating apparatus/method, the proper line adjustment of the text and the proper row height/column width are automatically calculated in response to an amount of the texts allocated to the respective item columns, and then such a table layout for optimizing a predetermined layout evaluation basis can be formed as the overall table.

In attaining the above object, the invention provides a table allocating apparatus including: text holding means for holding texts appearing in a table; connector holding means for holding a linear equation indicative of either a column width of the table, or a row height thereof with employment of a parameter; section constraint condition holding means for holding a section constraint condition corresponding to a combination of conditions for satisfying the parameter in order that either a height or a width of a rectangle becomes constant when the texts to be arranged in table item columns are allocated; layout evaluation formula calculating means for calculating a layout evaluation formula expressed by the linear equation with employment of the parameter for each of the section constraint conditions which represent better situations of the layout and are held in the section constraint condition holding means; linear programming problem solution engine means for solving such a linear programming problem that the section constraint condition held in the section constraint condition holding means is employed as a restriction condition and the layout evaluation formula corresponding to each of the section constraint conditions is employed as an objective function, and also for producing a signal which indicates either infeasibility of a problem solution, or a combination between an optimum layout evaluation value and a parameter corresponding to the optimum layout evaluation value; and linear programming problem managing means for performing at least a process operation to determine a layout of the table from the combination between the optimum layout evaluation value and the parameter corresponding to the optimum layout evaluation value among all of the linear programming problems based on the result outputted from the linear programming problem solution engine means.

Further, the invention provides a table allocating method including the steps of: setting both of a linear equation for representing a column width of a table or a row height thereof by employing a parameter, and a section constraint condition corresponding to a combination of conditions for satisfying the parameter in order that a height or a width of a rectangle becomes constant when each of texts arranged in a table item column is allocated; calculating a layout evaluation formula expressed by the linear equation with employment of the parameter and indicative of better states of a layout for each of the section constraint conditions; solving such a linear programming problem that the section constraint condition is used as a restriction condition and the layout evaluation formula corresponding to each of the section constraint conditions is used as an objective function, thereby obtaining a set of an optimum layout evaluation value and a parameter corresponding to the optimum layout evaluation value, or an infeasible solution of the problem; and when the set of the optimum layout evaluation value and the parameter corresponding thereto is acquired, retrieving a set of the optimum layout evaluation value and the parameter corresponding thereto based on the acquired result among all of the linear programming problems, whereby a table layout is determined based upon the set of the optimum layout evaluation value and the parameter corresponding thereto, and a line folding operation of a text appearing in the row height, the column width of the table, and in the table is automatically determined.

BRIEF DESCRIPTION OF THE DRAWINGS

For a better understanding of the present invention, reference is made of the detailed description to be read in conjunction with the accompanying drawings, in which:

FIGS. 3(A) and 3(B) are explanatory diagrams for indicating an example of a table formed by not designating the horizontal interval by the LaTeX system;

FIGS. 4(A) and 4(B) are explanatory diagrams for representing an example of a table formed by designating a dimension of the horizontal interval by the LaTeX system;

FIG. 5 is an explanatory diagram for indicating an example of a table demanded by a user;

FIGS. 7(A) and 7(B) are explanatory diagrams for showing an example of a box;

FIG. 10 is an explanatory diagram for showing an example of a table having a layout;

DETAILED DESCRIPTION OF THE PREFERRED EMBODIMENTS

Figures 6, 7:
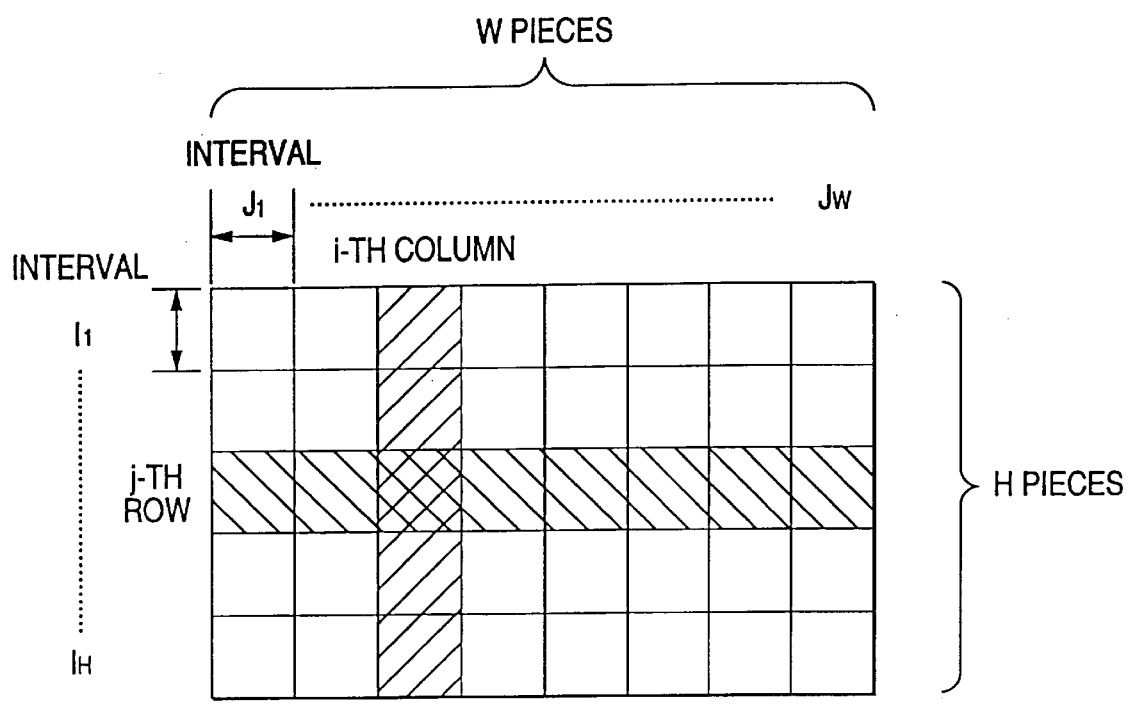
FIG. 6 is an explanatory diagram for representing an example of a table.

A table allocating apparatus/method according to the present invention will now be described in detail. First, terminology employed in this specification will be explained. FIG. 6 is an explanatory diagram for showing an example of a table. In FIG. 6, there is shown such a simple table of 5 rows×8 columns.

Terminology "grid" implies a rectangular subdivided into small squares by horizontal line segments and vertical line segments. That is, the entire table shown in FIG. 6 is a "grid". The grid virtually represents a frame of a table before being allocated. Each of line segments for subdividing the grid represents a table ruled line. The maximum number of the small squares arranged on the grid in the horizontal direction is called as a "width of the grid", and indicated by "W". Similarly, the maximum number of the small squares arranged on the grid in the vertical direction is called as a "height of the grid", and indicated by "H". In the table of FIG. 6, W=8 and H=5. Terminology "cell" implies a set of subdivided small squares.

A longitudinal, rectangular region surrounded by the i-th vertical ruled line and the (i+1)th vertical ruled line, and further the first horizontal ruled line and the (H+1)th horizontal ruled line on the grid is referred to as an i-th column of the grid. A transverse, rectangular region surrounded by the j-th and (j+1)th horizontal ruled lines and the first and (W+1)th vertical ruled lines is referred to as a j-th row of the grid. In FIG. 6, these rectangular regions are hatched.

A distance between the vertical ruled lines when a table frame is allocated is referred to as an horizontal interval, whereas a distance between the horizontal ruled lines is referred to as a vertical interval. In particular, distances between the adjacent ruled lines are referred to as a "basic horizontal interval", and a "basic vertical interval" respectively. In the table allocating process, all of the basic horizontal intervals and the basic vertical intervals are calculated, and then the dimension of the table frame is determined based on the calculation result. The basic horizontal intervals are expressed by $J_1, \ldots, J_W$ from the left end to the right end. On the other hand, the basic vertical intervals are expressed by $I_1, \ldots, I_H$ from the top to the bottom.

A text corresponds to a unit used to hold a content of an item appearing in an item column of a table. The expression "text" will have the following meaning in the below-mentioned description:

The text occupies a rectangular region (cell) constructed of a small square on a grid. A single cell may contain a plurality of small squares.

The text holds a character string corresponding to a content of an item.

In the table allocating process, after the necessary intervals are calculated to produce the table frame, a selection is made of an item column within the table frame based on the positions of the cells occupied by the respective texts on the grid, and the item contents held by the text are allocated to this item column. For the sake of simplicity, it should be understood that item contents of the respective texts are allocated from left to right in the below-mentioned description. The descriptions made according to this embodiment may be very easily extended in case that the texts are written from top to bottom, or the texts are written from left to right as well as from top to bottom.

It is assumed that font sizes of characters contained in a single text are constant. Under such an assumption, a change in a height of a rectangular region to which a text is allocated is equivalent to a change in a line folding number of the text. That is, only when the line folding number is increased, the height of the rectangular region is increased. When characters whose font sizes are different from each other are contained in a text, the above-described strict relationship cannot be established between the height of th rectangular region and the line folding number. Even when the line folding number is changed, the height of the rectangular region is not varied. Although the line folding number is increased, the height of the rectangular region is reduced. However, this assumption is not essential. In such a case that there are texts containing different font sizes of characters in a table, the descriptions made according to this embodiment may be easily extended, or expanded.

In the table allocating process, when an interval is calculated, a layout evaluation formula is calculated as a standard to measure a quality of a table layout obtained as an allocation result. In the layout evaluation formula, there are utilized an area of a table, a peripheral length of the table, and an area of a space region. For the sake of simple explanation, the smaller the value of this layout evaluation formula becomes, the better the quality of the table layout.

Under the above-described assumptions, the present invention is accomplished based on the following two characteristics:

Every time the line folding condition of the text is varied, namely the line folding number of one text is increased/decreased, the values used to evaluate the layout of the table such as the area of the table, the peripheral length of the table, and the area of the space region are varied in discontinuous form.

However, when the line folding condition of the text is constant, such values as the area of the table, the peripheral length of the table, and the area of the space region may be expressed by way of the linear equation about the row height or the column width.

For example, assuming now that a proper width is allocated to each column of a table, there are some possibilities that the line folding number of the texts in the item columns is increased or decreased when the width of this column is greatly varied. However, if the width of variations is within a sufficiently small range, then the line folding numbers of all texts remain unchanged. Since the row heights in the table are determined by the line folding numbers of the text, the heights of the respective rows are unchanged while the line folding number of the text is not changed. As a result, for example, since the area of the table is equal to a product between the all heights of the table (namely, constant) and a summation of the row widths, this table area becomes the linear equation concerning the column width. However, considering now such a case that the line folding number of the text is varied due to a change in the column widths, the area of the table is varied in discontinuous form under such a value of the column width that the line folding number is just changed. As a consequence, the area of the table is not equal to the continuous function as to the column width.

In accordance with the present invention, based upon such characteristics, one or more parameters are employed with which the column width (or the row height) in the table can be expressed by the linear equations, respectively. Within the section where the line folding condition of the text (namely, section where the number of the line to be folded is constant), with respect to the layout evaluation standard represented by the linear equation of the parameter, such a problem "to obtain an optimum value (maximum value, or minimum value) of the layout evaluation standard" is classified into a plurality of small problems. In each of these small problems, the line folding condition of the text is maintained constant. Then, the linear programming is applied to the respective small problems. The optimum layout value and th corresponding parameter value are locally calculated, thereby obtaining a local optimum solution. The local optimum solutions of all small problems are scanned to obtain the parameters by which the optimum layout evaluation value is given as a whole, whereby the optimum table layout is produced.

Figure 1:
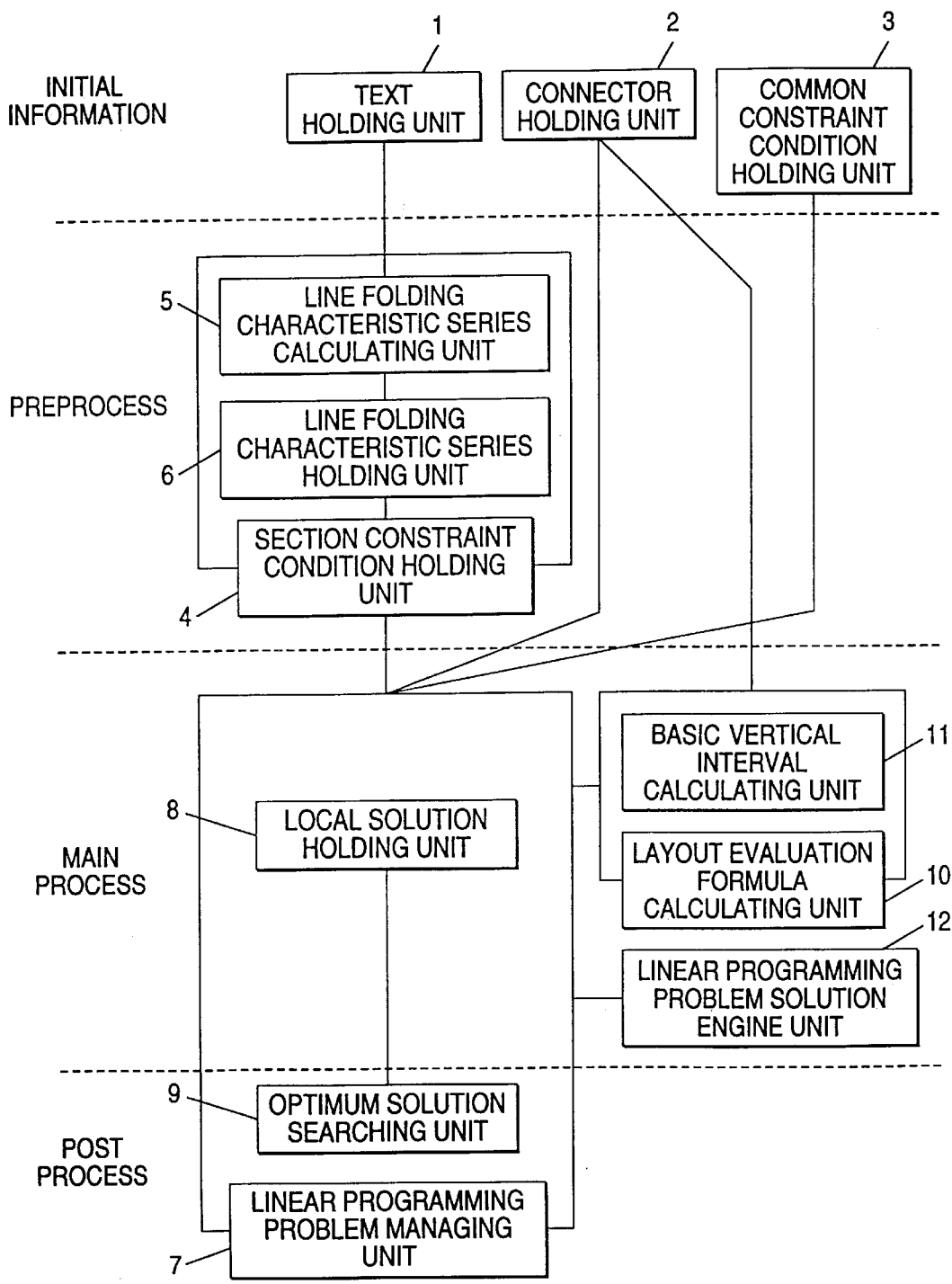
FIG. 1 is a schematic diagram for representing an arrangement of a table allocating apparatus according to a first embodiment of the present invention.
Figure 2:
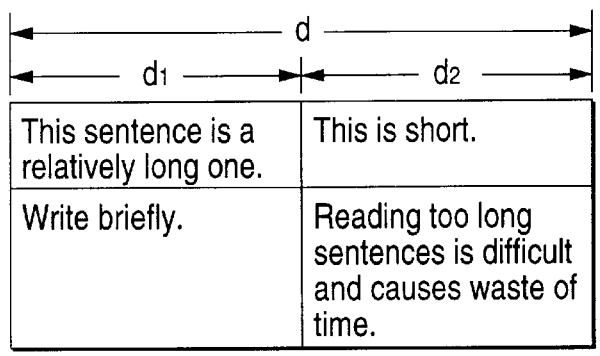
FIGS. 2(A) to 2(C) are explanatory diagrams for showing various shapes of tables.

FIG. 1 schematically shows an arrangement of a table allocating apparatus according to a first embodiment of the present invention. Reference numeral 1 designates a text holding unit; 2, a connector holding unit; 3, a common constraint condition holding unit; 4, a section constraint condition holding unit; 5, a line folding characteristic series calculating unit; 6, a line folding characteristic series holding unit; 7, a linear programming problem managing unit; 8, a local solution holding unit; 9, an optimum solution searching unit; 10, a layout evaluation formula calculating unit; 11, a basic vertical interval calculating unit; and 12, a linear programming problem solution engine unit.

The initial information required to form a layout of a table is held in the text holding unit 1, the connector holding unit 2 and the common constraint condition holding unit 3. The initial information is read into the table allocating apparatus via various means such as a network, a floppy disk, and a keyboard.

The text holding unit holds a text appearing in a table. That is, a set of a character string (containing modification attribute such as font size and font face) corresponding to an item content of a tale and positional information of a cell corresponding to the item column to which the character string should be allocated is held the number of which is equal to the number of table item column.

The positional information of the cell is expressed by the below-mentioned two vectors. Assuming now that the text T where the cell occupies the grid owns the a-th column through the b-th column of the grid and the common portion, a horizontal characteristic vector of the text T implies such a W-th row vector (W pieces of numerals) that the a-th to b-th elements are equal to 1 and the remaining elements are equal to 0. The horizontal characteristic vector of the text T is expressed as "$h_T$". Similarly, when the text T where the cell occupies the grid owns a c-th row to a d-th row of the grid and a common portion, a vertical characteristic vector of the text T is such an H-th column vector (H pieces of numerals) that the c-th to d-th elements are equal to 1 and the remaining elements are equal to 0. The vertical characteristic vector of the text T is expressed as "$V_T$". For instance, in an example shown in FIG. 6, assuming now that both the second to third columns and the third to fourth rows constitute a single cell, the horizontal characteristic vector $h_T=(0,1,1,0,0,0,0,0)$, and the vertical characteristic vector $v_T=t(0,0,1,1,0)$.

The connector holding unit 2 holds a connector corresponding to a linear equation with employment of a parameter. The parameters indicative of the table allocating condition are $x_1, \ldots, x_m$. With respect to the parameters of $x_1, \ldots, x_m$, the basic horizontal intervals $J_1, \ldots, J_w$ are expressed by employing a matrix $C=[c_{i,j}]$ having W rows and m columns:

$$J_i = c_{i,1}x_1 + \ldots + c_{i,m}x_m$$

This matrix C is called as a connector. The connector holding unit 2 holds this connector. Here, it is assumed that each of parameters $x_i$ is previously modified in order to have a non-negative value. When the parameters $x_1, \ldots, x_m$ also have negative values, it is substituted by employing a new parameter $u_i \geq 0$, $v_i \geq 0$ as follows:

$$x_i = u_i - v_i$$

Furthermore, the parameters $u_1, \ldots, u_m, v_1, \ldots, v_m$ are replaced by the parameters $x_1, \ldots, x_{2m}$. Also 2m is replaced by m, so that such a method as $x_1 \geq 0, \ldots, x_m \geq 0$ is normally employed.

The common constraint condition holding unit 3 holds a list of a linear equation, or a list of a linear inequality in which the constraint condition related to the table layout is employed as the parameter.

The line folding characteristic series calculating unit 5 calculates to line folding characteristic series of the respective texts as the preprocessing operation, and then the calculation result is stored into the line folding characteristic series holding unit 6 employed in the section constraint condition holding unit 4.

First, an explanation will be made of the line folding characteristic series. Considering that a text is allocated within a box. FIGS. 7(A) and 7(B) are explanatory diagrams for showing an example of a box. A box is a rectangle having a minimum dimension required to allocate a text. For example, as illustrated in FIG. 7(A), when a width of a box is sufficiently large, a text is allocated to 1 line, and it is sufficient that a height of the box needs 1 line. Conversely, when the width of the box becomes small, line folding occurs. As shown in FIG. 7(B), the text is allocated to a plurality of lines, and the height of the box is required which is equal to the number of folded lines.

Figure 8:
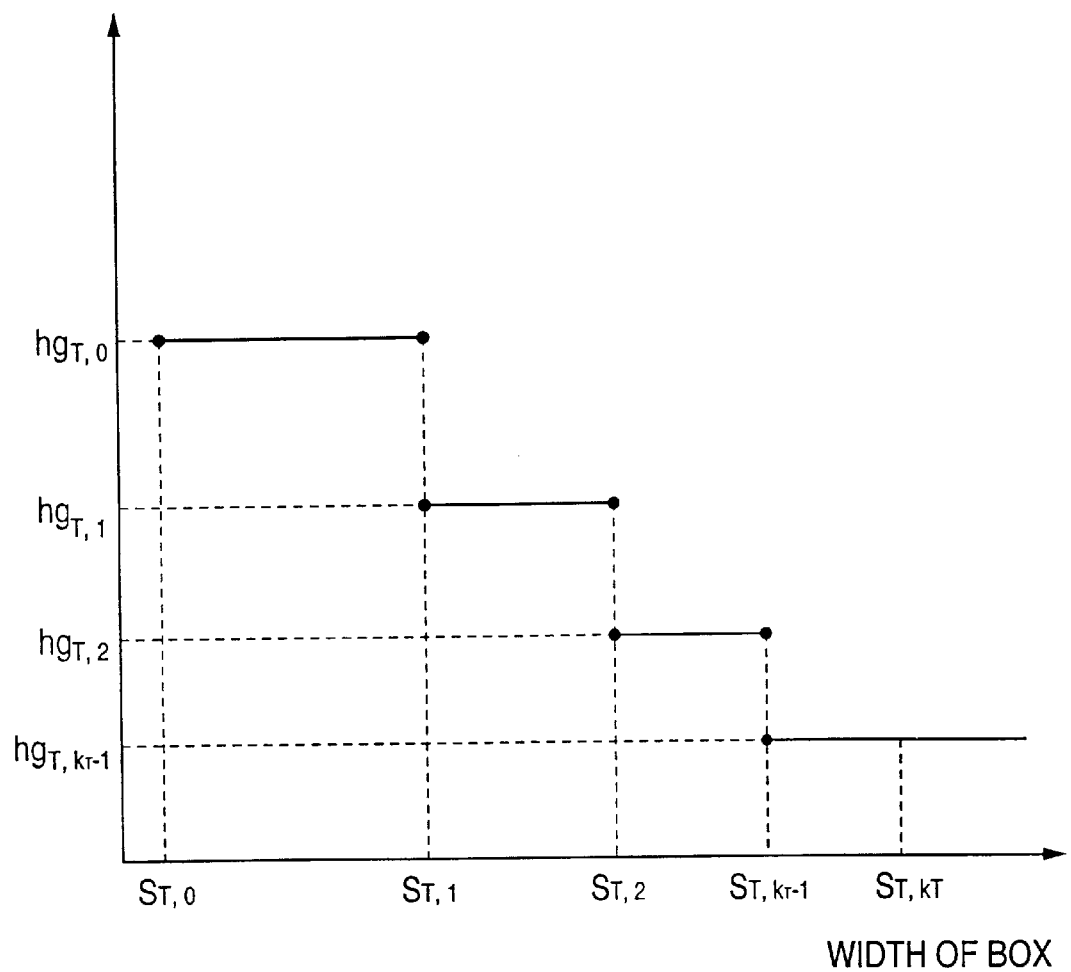
FIG. 8 is an explanatory diagram for indicating the line folding function.

Considering now that the text T is fixed. It should be understood that a function for returning a minimum height of a box to which the text T is allocated with respect to the width "w" of the box is called as a line folding function related to the text T. FIG. 8 is an explanatory diagram for explaining the line folding function. When the width of the box becomes narrow, and then is narrower than a certain width, the line folding happens to occur, so that the height of the box is increased. Then, since the width of the box is adjusted in accordance with an amount of a space within a line until it becomes narrower than a certain width, the height of the box becomes constant. As shown in FIG. 8, the line folding function corresponds to a decreasing function as well as a step function.

Furthermore, the line folding characteristic series ($s_{T,0}$, $s_{T,1}, \ldots, s_{T,K(T)}$) of the text T is defined as follows:

If $i<j$, then $s_{T,i} < s_{T,j}$

When the width w of the allocation block of the text T moves in the section $[s_{T,i}, s_{T,i+1}]$ with respect to the specific $i(i=0, 1, \ldots, k_T-1)$, the value of the line folding function is constant. This value is indicated by $hg_{T,i}$.

If $i<j$, then $hg_{T,i} > hg_{T,j}$

In other words, an increasing sequence made of a limit width value of a box where line folding is newly produced corresponds to the line folding characteristic series. Symbol $hg_{T,i}$ is called as a box height specific to the line folding characteristic value $s_{T,i}$. It should be noted that since no expression is made in a subscript of a subscript in the above expression of the line folding characteristic series, the subscript $k_T$ is indicated as $k(T)$. Symbol $k_T$ is merely different from the subscript $k(T)$ in view of expression. This rule is applied to the below-mentioned expression.

Prior to the main process, the line folding characteristic series calculating unit 5 calculates both of the line folding characteristic series related to the respective texts and the height of the box specific to the line folding characteristic value among the line folding characteristic series by employing the information held in the text holding unit 1, and stores the calculation results to the line folding characteristic series holding unit 6.

When the initial information is set and such section constraint conditions as the line folding characteristic series and the box height are calculated in the section constraint condition holding unit 4, the process operation is advanced to the main process. Both the main process and the post process are managed by the linear programming problem managing unit 7.

The linear programming problem managing unit 7 selects that $j_T$ satisfies $0 \leq j_T \leq k_T$ with respect to the respective texts T. Based on the selected $j_T$, three sorts of linear inequality groups are transferred as the constraint condition to the linear programming problem engine unit 12. It should be noted that symbol "d" is a margin width around a ruled line.

(1) Both of the constraint condition related to the respective texts T, namely the line folding characteristic series: ($s_{T,0}, s_{T,1}, \ldots, s_{T,k(T)}$) and the condition defined by the horizontal characteristic vector $h_T$ and the connector C:

$$s_{T,j(T)} \leq h_T{}^*[c_{i,j}]^{T,t}(x_1, \ldots, x_m) - d \leq s_{T,j(T)+1}$$

(2) The constraint condition used to define the column width as to an arbitrary $i(i=1, \ldots, w)$:

$$J_i = (0, \ldots, 0, 1, 0, \ldots, 0)^*[c_{i,j}]^{T,t}(x_1, \ldots, x_m) \geq 0$$

(3) Either the linear equation, or the linear inequality representative of the constraint condition between the parameters held by the common constraint condition holding unit 3.

The above-described constraint condition (1) is given as follow if it satisfies:

$$h_T{}^*[c_{i,j}]^{T,t}(x_1, \ldots, x_m) = p_{T,1}x_1 + \ldots + p_{T,m}x_m.$$

Then, $$s_{T,j(T)} \leq p_{T,1}x_1 + \ldots p_{T,m}x_m - d \leq s_{T,j(T)+1}$$

When the line folding characteristic series specific to the respective texts $T_i(i=1, \ldots, k)$ is equal to $s_{i,0}, \ldots, s_{i,k(i)}$, if the linear programming problem managing unit 7 represents $j_{T(i)} = j_i(0 \leq j_i \leq k_i-1)$ with respect to the respective texts Ti, then the constraint condition by the above (1) is expressed as follows:

$$p_{1,1}x_1 + \ldots + p_{1,m}x_m - d \geq s_{1,j(1)}$$
$$p_{1,1}x_1 + \ldots + p_{1,m}x_m - d \geq s_{1,j(1)+1}$$
$$\ldots$$
$$p_{k,1}x_1 + \ldots + p_{k,m}x_m - d \geq s_{k,j(k)}$$
$$p_{k,1}x_1 + \ldots + p_{k,m}x_m - d \leq s_{k,j(k)+1}$$

The above-mentioned constraint condition is called as the section constraint condition about "$(j_1, \ldots, j_k)$ problem".

On the other hand, both of the constraint condition originated from the above constraint condition (2) and the common constraint condition shown in the constraint condition (3) are defined as follows by conducting a slack variable, if required:

$$p'_{1,1}x_1 + \ldots + p'_{1,m}x_m = s'_1$$
$$\ldots$$
$$p'_{k',1}x_1 + \ldots + p'_{k',m}x_m = s'_{k'}.$$

Furthermore, the constraint conditions are adjusted in order to satisfy $s_i 40 \geq 0$.

In addition, the linear programming problem managing unit 7 acquires from the section constraint condition holding unit 4, the box height corresponding to the line folding characteristic series $si,j(i)$ specific to the "$(j_1, \ldots, j_k)$ problem" with respect to the respective texts $T_i$, and then transfers this box height to the layout evaluation formula calculating unit 10. As a result, the linear programming problem managing unit 7 receive the layout evaluation formula.

Furthermore, these constraint conditions may be standardized by conducting the slack variables $y_1, z_1, \ldots, y_k$, and $z_k$:

$$\begin{bmatrix} p_{1,1} & \ldots & p_{1,m} & 1 & 0 & \ldots & \ldots & \ldots & 0 \\ p_{1,1} & \ldots & p_{1,m} & 0 & -1 & 0 & \ldots & \ldots & 0 \\ \cdot & & \cdot & \cdot & & & & & \cdot \\ \cdot & & \cdot & \cdot & & & & & \cdot \\ \cdot & & \cdot & \cdot & & & & & \cdot \\ p_{k,1} & \ldots & p_{k,m} & 0 & \ldots & \ldots & 0 & 1 & 0 \\ p_{k,1} & \ldots & p_{k,m} & 0 & \ldots & \ldots & \ldots & 0 & -1 \\ p'_{1,1} & \ldots & p'_{1,m} & 0 & \ldots & \ldots & \ldots & \ldots & 0 \\ \cdot & & \cdot & \cdot & & & & & \cdot \\ \cdot & & \cdot & \cdot & & & & & \cdot \\ \cdot & & \cdot & \cdot & & & & & \cdot \\ p'_{k'-1,1} & \ldots & p'_{k'-1,m} & 0 & \ldots & \ldots & \ldots & \ldots & 0 \\ p'_{k',1} & \ldots & p'_{k',m} & 0 & \ldots & \ldots & \ldots & \ldots & 0 \end{bmatrix} \begin{pmatrix} x_1 \\ \cdot \\ \cdot \\ \cdot \\ x_m \\ y_1 \\ z_1 \\ \cdot \\ \cdot \\ y_k \\ z_k \end{pmatrix} =$$

-continued

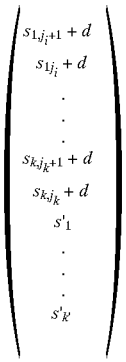

$$s'_1 \geq 0, \ldots, s'_{k'} \geq 0$$

These objective function and constraint conditions are passed to the linear programming problem solution engine unit 12. Then, a value returned from the linear programming problem solution engine unit, namely, either a set of the minimum value of the objective function and a parameter for giving the minimum value, or a signal for indicating that the linear programming problem is infeasible is added to the list contained in the local solution holding unit 8. The linear programming problem managing unit 7 executes the above-described procedure with respect to the combinations over all of the texts of the line folding characteristic values related to the respective texts. The combination of the line folding characteristic value allocated to each of these texts may determine a single linear programming problem. That is, the "$(j_1, \ldots, j_k)$ problem" is specified to be solved as to all $(j_1, \ldots, j_k)\epsilon[0, \ldots, k_1-1]x \ldots x[0, \ldots, k_k-1]$. After the linear programming problem managing unit 7 has solved all of the possible linear programming problems, the control operation is advanced to the optimum solution searching unit 9 within the linear programming problem managing unit 7.

The optimum solution searching unit 9 searches the contents of the list in the local solution holding unit 8 to acquire the optimum parameter corresponding to the minimum value of the objective function. Finally, the line height and the column width are calculated from the optimum parameters searched and obtained, so that a layout of a table is determined.

From the linear programming problem managing unit 7, the specific box height held in the line folding characteristic series holding unit 6 in the section constraint condition holding unit 4 is passed to the layout evaluation formula calculating unit 10, and this layout evaluation formula calculating unit 10 calculates the layout evaluation formula with reference to $[c_{ij}]$ held in the connector holding unit 2 and transfers the calculation result to the linear programming problem managing unit 7.

Based on the entered specific box height $h_{gT(i),j(i)}$, the basis vertical interval calculating unit 11 in the layout evaluation formula calculating unit 10 calculates the basic vertical intervals $I_1, \ldots, I_H$. Several calculation methods may be conceived. For instance, the algorithm for the first fit method may be utilized. This first fit method is the recently widely used method, and is characterized in that the I-th basic vertical interval $I_i$ on the grid plane is sequentially calculated from $I_1$.

The process operation performed according to the first fit method will now be summarized. Symbol I is an H-th row vector which is initialized as a zero vector $[0, \ldots, 0]$. Symbol "d" indicates a margin around a ruled line common to the respective ruled lines. No text is injected into a distance of d/2 from the respective ruled lines. Symbol W[i] indicates an i-th component for the vector W.

When the inherent box height $h_{gT(j),j(j)}$ of the text $T_j$ is inputted, the following process operation is repeated from i=1 to H. As to all the texts $T_j$, under such conditions: the i-th element of the vertical characteristic vector $v_{T(j)}[i]=1$; $v_{T(j)}[i+1]=0$ or i=H and also $hg_{T(j),j(j)} > I^*v_{T(j)}-d$; an equation of $I[i]=I[i]+h \, g_{T(j),j(j)}-I^*v_{v(j)}+d$ is calculated. In a formula, an operator * indicates either a multiplication of scaler amounts, or a multiplication of matrixes.

With such a process operation, the respective elements I[i] of the vector I are successively calculated. The resulting vector I corresponds to a series of the basic vertical interval. Namely, the finally obtained vector I corresponds to $I=[I_1, \ldots, I_H]$.

Based on the basic vertical intervals calculated by the base vertical interval calculating unit 11, the layout evaluation formula is calculated. As the layout evaluation base, the area of the table, the peripheral length of the table, and the space area may be employed. As to these three cases, the layout evaluation formulae are described:

The area of the table:

$$(I_1+\ldots+I_H)^*\{(c_{1,1}+\ldots+c_{W,1})x_1+\ldots+(c_{1,m}+\ldots+c_{W,m})x_m\}$$

The peripheral length of the table:

$$(I_1+\ldots+I_H)+\{(c_{1,1}+\ldots+c_{W,1})x_1+\ldots+(c_{1,m}+\ldots+c_{W,m})x_m\}$$

The space area:

A summation of the below-mentioned space areas as to the respective texts Ti becomes the entire space area;

$$\{h_{T(i)}{}^*[c_{i,j}]\cdot {}^t(x_1, \ldots, x_m)-d\}\{I_1, \ldots, I_H)^*v_{T(i)}-hg_{T(i),j(i)}-d\}$$

Note that symbol $'(x_1, \ldots, x_m)$ indicates a transposed vector. That is, it corresponds to a column vector (vertically arranged elements) made of $x_1, \ldots, x_m$.

In any of these cases, when $hg_{T(i),j(i)}$ is specified to all of Ti, the layout evaluation becomes a linear function related to the parameters $x_1, \ldots, x_m$. The layout evaluation formula calculating unit 10 executes the above-described procedure and then returns the calculated layout evaluation formula to the linear programming problem managing unit 7.

The linear programming problem solution engine unit 12 searches a set of parameters for minimizing the value of the objective function and this minimum value within the range capable of satisfying the given constraint condition, and then reports them to the linear programming problem managing unit 7. When there is no such a minimum value, this engine unit 12 reports such a fact that the linear programming problem is infeasible to the linear programming problem managing unit 7. As the algorithm of the linear programming problem solution engine unit 12, the simplex method and the perturbation method are widely known, and the linear programming problem can be solved by employing these methods.

Figure 9:
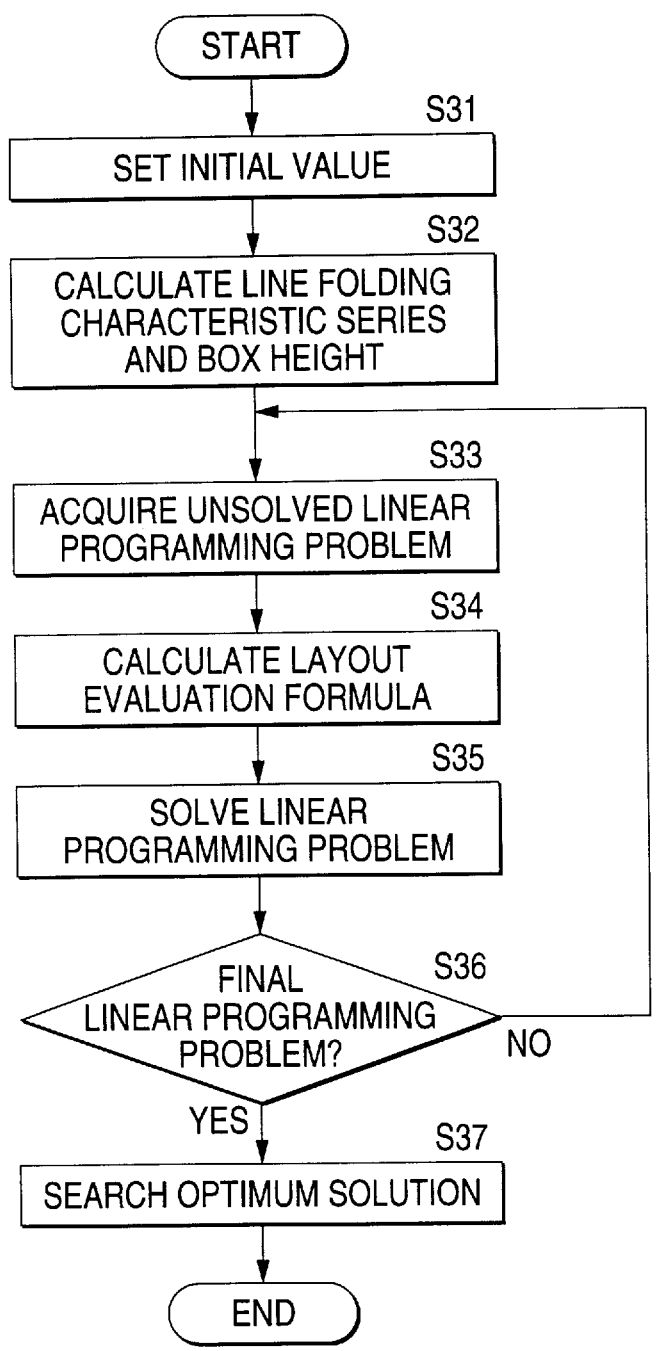
FIG. 9 is a flowchart for indicating a summary of table allocating operation of the table allocating apparatus according to the first embodiment of the present invention.

FIG. 9 is a flowchart for explaining a summary of the operation performed in the table allocating apparatus according to the first embodiment of the present invention. At step S31 of this flowchart, as the initial information, the text and the linear equation indicative of the conditions of the table layout are stored into the text holding unit 1, the connector holding unit 2, and the common constraint condition holding unit 3, respectively. At step S32, in accordance with the text held in the text holding unit 1, such section constraint conditions as the line folding characteristic series and the box height are calculated by the section constraint condition holding unit 4 and stored therein. At step 33, the linear programming problem managing unit 7 specifies one of the line folding characteristic values $s_{i,j(i)}$ with respect to each of the texts Ti from the calculated line folding characteristic series. At this time, the linear programming problem managing method 7 selects such that the linear programming problem by the combination of the section constraint conditions has not yet been solved. Subsequently, at step S34, the set of the inherent box heights specific to the line folding characteristic value defined at step S33 is acquired from the section constraint condition holding unit 4, and is supplied to the layout evaluation formula calculating unit 10, so that the layout evaluation formula is obtained. At step S35, the linear programming problem managing unit 7 uses the layout evaluation formula obtained at step S34 as the objective function, and then the linear programming problem is solved by the linear programming problem solution engine unit 12 with having the following constraint conditions, i.e., the set of section constraint conditions specified at step S33, the constraint condition obtained from the connector held in the connector holding unit 2, and the common constraint condition held in the common constraint condition holding unit 3. Then, the value at which the objective function becomes minimum, the set of parameters obtained at this time, or the information for indicating that the linear programming problem is infeasible is obtained from the linear programming problem solution engine unit 12. The linear programming problem managing unit 7 solves the linear programming problem with respective to all of the combinations of the line folding characteristic values obtained by allocating the line folding characteristic values one by one to the respective texts. At step 36, a judgement is made as to whether or not the linear programming problem solved at step S35 corresponds to the last unsolved linear programming problem. When this linear programming problem is not the last unsolved linear programming problem, the process operation is returned to step S33. Then, the process operation is continued. When the solved linear programming problem corresponds to the final unsolved linear programming problem, the process operation is advanced to step S37. At this step, the linear programming problem managing unit 7 searches from the solutions of the linear programming problems obtained by the linear programming problem solution engine unit 12, such a minimum value among the values where the objective function of each linear programming problem is minimized, so that the optimum parameter corresponding to this minimum value is obtained. In accordance with this parameter, a table is constructed, so that such a table having an optimum layout can be obtained. Since the detailed operations at the respective steps have already been explained, they are omitted in this description.

FIG. 10 is an explanatory diagram for showing an example of a table with a resultant layout. Concretely speaking, considering to produce such a table as indicated in FIG. 10. As the initial information, the texts to be allocated to the respective columns, for instance, a "conjugated form" and a "non-conjugated form", and also the horizontal characteristic vector $h_T$ and vertical characteristic vector $v_T$ of this text are stored into the text holding unit 1. For example, in the text "non-conjugated form", the horizontal characteristic vector $h_T=(1,0,0,0)$ and the vertical characteristic vector $v_{T-}'(0,1,1,1,0)$. Other various information such as character sorts and sizes of characters is stored. In the common constraint condition holding unit 3, the condition formula indicative of the below-mentioned three conditions is stored.

(1) The entire width is smaller than, or equal to 87.85 mm (=250 points).

(2) The width of the second column (i.e., column to which "one does not constitute a subject" is allocated) is equal to the width of the third column (i.e., column to which "being modifier" and "being not modifier" are allocated).

(3) The lines of the texts contained in the respective item columns are not folded over 4 lines (namely, condition under which a text is observed from left to right).

These conditions are set and then the table allocating apparatus according to the present invention is executed, so that the widths of the respective columns, the heights of the respective rows, and the line folding of the respective texts are automatically set, resulting in such a table as shown in FIG. 10.

Figure 11:
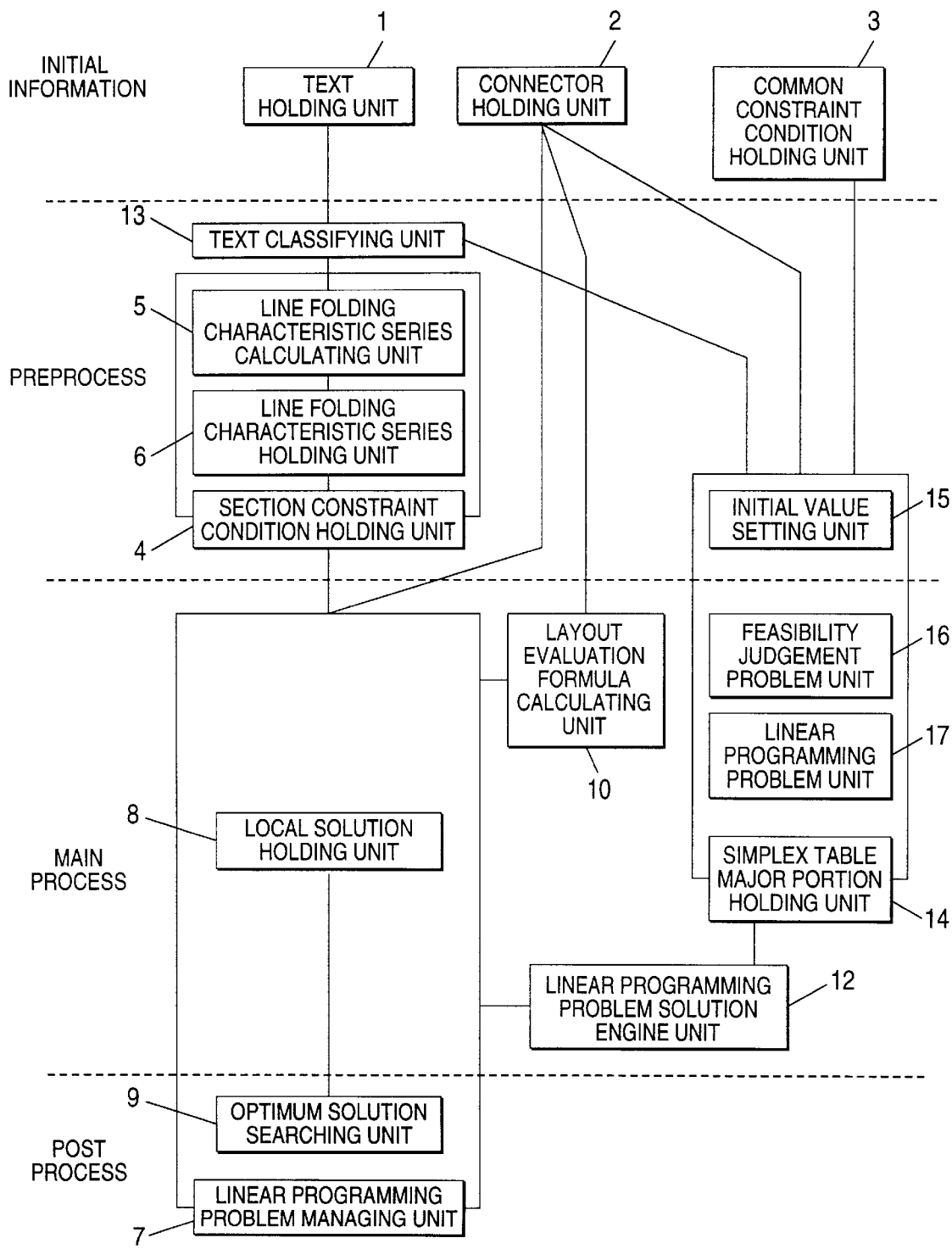
FIG. 11 is a schematic diagram for indicating an arrangement of a table allocating apparatus according to a second embodiment of the present invention.

FIG. 11 schematically illustrates an arrangement of a table allocating apparatus according to a second embodiment of the present invention. In FIG. 11, the same reference numerals shown in FIG. 1 are employed as those for designating the same, or similar portions, and explanations thereof are omitted. Reference numeral 13 designates a text classifying unit; 14, a simplex table major portion holding unit; 15, an initial value setting unit; 16, a feasibility judgement problem unit; and 17, a linear programming problem unit. In this second embodiment, the table allocating apparatus employs the text classifying unit 13 for classifying the text held in the text holding unit 1 into text classes based on the co-dimensional portion of the linear equation of the parameter for indicating the box width, and the simplex table major portion holding unit 14 for holding such portions charged with a plurality of linear programming problems, namely the major portion among the simplex tables calculated by the linear programming problem solution engine unit 12 for each of the linear programming problems.

As the text class, all of such texts are collected that co-dimensional portions $p_{T,1}x_1+ \ldots p_{T,m}x_m$ of the linear equation of the parameters which represent the width for allocating the text. The classified text forms the text class corresponding to co-dimensional portions of the respective constraint conditions in one-to-one correspondence. In other words, the text belonging to a single text class commonly shares co-dimensional portions about the section constraint condition concerning the line folding.

The sector constraint condition holding unit 4 in the first embodiment allocates the line folding characteristic values as the upper limit and the lower limit to co-dimensional portion of this section constraint condition as to each text, so that the specific constraint condition is determined. At this time, the combinations of the upper limit allocation and the lower limit allocation over the entire text become a total number of linear programming problems which should be solved by the linear programming problem managing unit 7. However, according to this second embodiment, with respective to each of the text classes classified by the text classifying unit 13, more than one combination between the upper limit and the lower limit, which are allocated to the co-dimensional portion and the co-dimensional portion of the section constraint condition, is held in the section constraint condition holding unit 4.

Then, with respect to the respective text classes, the upper limit and the lower limit are allocated to the co-dimensional portion of the relevant section constraint condition, so that a single set of section constraint conditions is defined. A total number of such combinations becomes a total number of linear programming problems which should be solved by employing the linear programming problem resolution engine unit 12.

With employment of the text class, a total number of linear programming problems to be solved may be reduced, as compared with the method according to the above-described first embodiment. This will now be explained with employment of an example. The texts $T_1$ and $T_2$ belong to the common text classes. The co-dimensional portion of the section constraint condition common to both cases is selected to:

$p_1x_1+\ldots+p_mx_m.$

When the upper limit and lower limit combinations with respect to the text $T_i(i=1,2)$ are $[s_{i,4}, s_{i,3}], [s_{i,3}, s_{i,2}]$ and $[s_{i,2}, s_{i,1}]$, the following conditions are given as the constraint conditions:

$$s_{i,4} \geq p_1x_1+\ldots+p_mx_m \geq s_{i,3}$$

$$s_{i,3} \geq p_1x_1+\ldots+p_mx_m \geq s_{i,2}$$

$$s_{i,2} \geq p_1x_1+\ldots+p_mx_m \geq s_{i,1}$$

That is to say, the above-described three constraint conditions are owned by the texts $T_1$ and $T_2$. As a result, combinations between the constraint conditions related to the texts $T_1$ and $T_2$ are defined by 3×3=9.

On the other hands, assuming now that $s_{1,1} < s_{2,1} < s_{1,2} < s_{2,2} < s_{1,3} < s_{2,3} < s_{1,4} < s_{2,4}$, only 7 constraint conditions related to the text class are required as follows:

$$s_{2,4} \geq p_1x_1+\ldots+p_mx_m \geq s_{1,4}$$

$$s_{1,4} \geq p_1x_1+\ldots+p_mx_m \geq s_{2,3}$$

$$s_{2,3} \geq p_1x_1+\ldots+p_mx_m \geq s_{1,3}$$

$$s_{1,3} \geq p_1x_1+\ldots+p_mx_m \geq s_{2,2}$$

$$s_{2,2} \geq p_1x_1+\ldots+p_mx_m \geq s_{1,2}$$

$$s_{1,2} \geq p_1x_1+\ldots+p_mx_m \geq s_{2,1}$$

$$s_{2,1} \geq p_1x_1+\ldots+p_mx_m \geq s_{1,1}$$

This deference is greatly expanded when a total set number is increased with respect to the total number of texts and the upper/lower limits of each text. This is because the total number of combinations between the constraint conditions by the former case is on the order of the product made of the number of constraint conditions related to the respective texts, whereas this total number is on the order of the summation thereof by the latter case. As a consequence, it is possible to reduce the total number of linear programming problems to be solved, as compared with the total number of linear programming problems for solving the section constraint conditions every text, so that the efficiency of the process operation can be increased.

As described above, since the constraint condition is set with respect to each text class, the text classifying unit 13 scans the texts held in the text holding unit 1 to classify it into the text class. In the process operation to classify the text into the text class, first, the width of the allocation box used to allocate the text T is expressed by the linear equation of the parameter as to the respective texts T. As previously explained in the first embodiment with reference to FIGS. 7(A) and 7(B), an allocation box implies such a rectangular having a minimum dimension required to allocate a text. A width of an allocation box is expressed as follows when a margin around a ruled line contained in a table is indicated as "d", namely a text is not allocated to an area within a distance d/2 from the relevant ruled line:

$$h_T^*[c_{ij}]^* \begin{pmatrix} x_1 \\ \vdots \\ x_m \end{pmatrix} - d$$

Next, the texts commonly using the co-dimensional portion of the linear equation indicative of the width of the box are collected to be registered as the text class. In this embodiment, since all of the margins around the respective ruled lines are equal to each other, such a fact that the linear equations indicative of the widths of the allocation boxes are coincident with each other is equivalent to such a fact that the co-dimensional portions thereof are coincident with each other. However, in case that the margins are changed every ruled line, even when the co-dimensional portions are identical to each other, the widths of the allocation boxes are not always coincident with each other.

It is assumed that the text classes are numbered and indicated as $C_1, \ldots, C_k$. As to each text class $C_1$, the above-described co-dimensional portion of the linear equation representing the width of the allocation box of the related text is expressed as the below-mentioned expression, and then registered together with the text class:

$$p_{i,1}x_1+\ldots p_{i,m}x_m$$

As described above, the section constraint condition in the section constraint condition holding unit 4 is calculated with respect to each of these classified text classes. The co-dimensional portion of the linear equation for the parameter indicative of the width of the allocation box is also employed in the simplex table major portion holding unit 14, and is referred when the initial value of the simplex table major portion about the feasible judging problem is calculated in the initial setting unit 15.

As previously explained, the simplex method and the perturbation method are widely known as the method for solving the linear programming problem executed in the linear programming problem situation engine unit 12. These known methods are characterized in that a so-called "simplex table" i.e., matrix is sequentially calculated until a predetermined ending condition is satisfied. In other words, if the simplex table can satisfy a specific ending condition (simplex base I and simplex base II), then an optimum solution is extracted. Conversely, when the simplex table cannot satisfy a specific ending condition, then another simplex table is newly calculated (pivot transformation) in accordance with a specific method (simplex base III), and further the ending condition is checked. In a series of calculation, all of the simplex tables have the same row numbers and the same column numbers. The above-described simplex bases I to III are the generic base for the simplex method. This is described in, for instance, Japanese document entitled "Linear Inequality and Application thereof" written by T. Iwabori (Basic math. of IWANAMI Publisher).

Precisely speaking, a simplex table corresponds to an inherent sequence called as a "feasible basic index". Assuming now that a simplex table (simple simplex table is expressed as simplex table) is equal to a matrix of r+1 rows n+1 columns, the feasible basic index is a sequence $(a_1, \ldots, a_r)$ of a natural number for satisfying the following conditions:

$$a_1 < a_2 < \ldots a_r$$

$$1 \leq a_i \leq n$$

The simplex table belonging to the feasible basic index $(a_1, \ldots, a_r)$ corresponds to such a matrix of the relative component which is obtained by base-transforming a specific r+1 rows n+1 columns matrix determined to the linear programming problem under such conditions: from the $a_1$-th column vector to the $a_r$-th column vector (feasible base), and the following equation is used as a base:

$$e_0 = \begin{pmatrix} 0 \\ \vdots \\ 0 \\ 1 \end{pmatrix}$$

The relative portion related to $e_0$ appears in the $(r+1)$th row, and the relative portion related to the $a_r$-th column vector appears in the i-th row. Either the simplex table, or a partial matrix of r rows×n columns excluding the lowermost row and the rightmost column from the original matrix thereof is referred to a "major portion" hereinafter.

On one hand, with respect to the respective linear programming problems held in the section constraint condition holding unit 4, the major portion of the matrix constituting the simplex table owns a single meaning irrelevant to th linear programming problem. As a consequence, the respective linear programming problems commonly shares the major portion of the simplex table, so that the result of the calculation once executed can be reused. As a consequence, the workload of such a recalculation can be omitted and thus the efficiency of the process operation can be increased. The simplex table major portion holding unit 14 provides this function.

In the simplex table major portion holding unit 14, the combinations between the feasible basic index and the major portion of the simplex table are registered as a list. When the feasible basic index is once given, the major portion of the simplex table is retrieved based on this basic index as a key. When the linear programming problem solution engine unit 12 calculates such a simplex table belonging to the feasible basic index which has not yet been registered, this major portion is added into the list of the simplex table major portion holding unit 14 together with the feasible basic index.

The simplex table major portion holding unit 14 includes the initial value setting unit 15, feasibility judgement problem unit 16, and linear programming problem unit 17. The initial value setting unit 15 acquires necessary information from the text classifying unit 13, the connector holding unit 2, and the common constraint condition holding unit 3, and then calculates the below-mentioned initial value of the simplex table major portion about the feasible judgement problem;

m+4k+k'). The major portion of the simplex table searches this feasible basic index as the key.

Both the feasible judgement problem unit 16 and the linear programming problem unit 17 are a list constructed of a combination between the feasible basic index and the major portion of the simplex table belonging to the feasible base designated by the feasible basic index. The combinations contained in the list are retrieved while the feasible basic index is used as a key. The linear programming problem solution engine unit 12 forms the simplex table with employment of the major portions of the simplex tables held in the linear programming problem unit 17 and the feasible judgement problem unit 16, and calculates the simplex table. In the major portion of the calculated simplex table, the simplex tables which have not yet been registered into the feasible judgement problem 16 and the linear programming problem 17 are registered.

Other arrangement of the second embodiment are substantially similar to those of the first embodiment. The initial information required to form the layout of the table is held in the text holding unit 1, the connector holding unit 2, and the common constraint condition holding unit 3.

The section constraint condition holding unit 4 holds more than one line folding characteristic value corresponding to the section constraint condition for each of the text classes. That is, as to all the texts T belonging to the text class Ci, the line folding characteristic series thereof are calculated. Then, a series produced by sequencing the summation of these values in the increasing order becomes the line folding characteristic series of the text class Ci. The line folding characteristic series of the text class Ci is expressed as:

$$s_{i,o}, \ldots, s_{i,1(i)}$$

Prior to the main process, the line folding characteristic series calculating unit 5 calculates the line folding characteristic series for each of the text classes classified by the text classifying unit 13 with employment of the information held in the text holding unit 1, and records the calculation results in the line folding characteristic series holding unit 6.

The linear programming problem managing unit 7 scans the information held in the line folding characteristic series holding unit 6 employed in the section constraint condition holding unit 4 to acquire a single line folding characteristic value $(s_i, j_{(i)}$, note $j_i$ satisfies $0 \leq j_i \leq 1_i-1)$ with respect to the $$\begin{bmatrix}
p_{1,1} & \cdots & p_{1,m} & 1 & 0 & \cdots & \cdots & \cdots & 0 & 1 & 0 & & \cdots & \cdots & \cdots & \cdots & \cdots & 0 \\
p_{1,1} & \cdots & p_{1,m} & 0 & -1 & 0 & \cdots & \cdots & 0 & 0 & 1 & 0 & \cdots & \cdots & \cdots & \cdots & \cdots & 0 \\
\vdots & & \vdots & \vdots & & & & & \vdots & & & & & & & & & \vdots \\
p_{k,1} & \cdots & p_{k,m} & 0 & \cdots & \cdots & 0 & 1 & 0 & \cdots & & 0 & 1 & 0 & \cdots & \cdots & \cdots & 0 \\
p_{k,1} & \cdots & p_{k,m} & 0 & \cdots & \cdots & \cdots & 0 & -1 & 0 & \cdots & & 0 & 1 & 0 & \cdots & \cdots & 0 \\
p'_{1,1} & \cdots & p'_{1,m} & 0 & \cdots & \cdots & \cdots & \cdots & 0 & 0 & \cdots & \cdots & \cdots & 0 & 1 & 0 & \cdots & 0 \\
\vdots & & \vdots & \vdots & & & & & \vdots & & & & & & & & & \vdots \\
p'_{k'-1,1} & \cdots & p'_{k'-1,m} & 0 & \cdots & \cdots & \cdots & \cdots & 0 & 0 & \cdots & \cdots & \cdots & \cdots & & 0 & 1 & 0 \\
p'_{k',1} & \cdots & p'_{k',m} & 0 & \cdots & \cdots & \cdots & \cdots & 0 & 0 & \cdots & \cdots & \cdots & \cdots & & & 0 & 1
\end{bmatrix}$$

Then, the initial value setting unit 15 registers the calculated initial value into the feasible judgement problem unit 16 together with the feasible basic index (m+2k+1, ..., respective text classes Ci. At this time, it implies "the $(j_1, \ldots, j_k)$ problem" is specified. As to the $(j_1, \ldots, j_k)$ problem, a range where the parameter can be defined is limited to:

$$s_{i,j(i)} \leq p_{i,1}x_1 + \ldots + p_{i,m}x_m - d \leq s_{i,j(i)+1}$$

Subsequently, the linear programming problem managing unit 7 passes the box heights of the respective texts defined by specifying $(j_1, \ldots, j_k)$ to the layout evaluation formula calculating unit 10, and accepts the layout evaluation formula accordingly. The acquired layout evaluation formula is passed as the objective function to the linear programming problem solution engine unit 12. The constraint condition transferred to the linear programming problem solution engine unit 12 is different from that of the first embodiment, is defined by the following format. In other words, when the $(j_1, \ldots, j_k)$ problem is specified, this constraint condition is a series of combinations of the line folding characteristic values $[(s_{i,j(i)}, s_{i,j(i)+1})]_{i=1,2,\ldots,k}$. The linear programming problem managing unit 7 adds the value returned from the linear programming problem solution engine unit 12 to the list contained in the local solution holding unit 8. This value corresponds to either a combination with a parameter for giving a minimum value and a maximum value of an objective function, or a signal indicative that the linear programming problem is infeasible.

The linear programming problem managing unit 7 executes the above-described procedure for all combinations over the entire texts as to the line folding characteristic values related to the respective texts. The $(j_1, \ldots, j_k)$ problem is solved with regard to all combinations of $j_i, \ldots, j_k$ which satisfy the following condition:

$$0 \leq j_1 \leq 1_1-1,\ 0 \leq j_2 \leq 1_2-1,\ \ldots,\ 0 \leq j_k \leq 1_k-1$$

After all of the possible linear programming problems have been solved, the linear programming problem managing unit 7 sequentially searches the list in the local solution holding unit 8 by way of the optimum solution searching unit 9 employed in the linear programming problem managing unit 7, whereby the optimum parameter corresponding to the minimum value of the objective function is acquired. Finally, a calculation is made of the row height and the column width from the searched optimum parameters, so that a layout of this table is determined.

Based on the height of the allocation box of each text given from the linear programming problem managing unit 7, the layout evaluation formula calculating unit 10 calculates the layout evaluation formula inherent to the $(j_1, \ldots, j_k)$ problem, and returns the calculated layout evaluation formula to the linear programming problem managing unit 7. At this time, the layout evaluation formula is a linear function related to the parameters $x_1, \ldots, x_m$.

The layout evaluation formula returned by the layout evaluation formula calculating unit 10 to the linear programming problem managing unit 7 is expressed by:

$$v_1x_1 + \ldots + v_mx_m$$

Note that symbols $v_1, \ldots, v_m$ show real numbers depending on the $(j_i, \ldots, j_k)$ specific to the linear programming problem managing unit 7.

The linear programming problem solution engine unit 12 receives as an objective function, the layout evaluation formula $v_1x_1 + \ldots + v_mx_m$ from the linear programming problem managing unit 7, and further accepts as a constraint condition, a series of combinations of the line folding characteristic values $\{(s_{i,j(i)}, s_{i,j(i)+1})\}_{i=1,2,\ldots,k}$. Then, this engine unit 12 finds out the minimum value and the set of parameters for minimizing the value of the objective function within the range for satisfying the given constraint conditions, and reports the resultant values to the linear programming problem managing unit 7. Based upon the series of combinations of the given line folding characteristic values $\{(s_{i,j(i)}, s_{i,j(i)+1})\}_{i=1,2,\ldots,k}$, the connector held in the connector holding unit 2, and the common constraint condition held in the common constraint holding unit 3, the linear programming problem solution engine unit 12 will calculate such a constraint condition given as:

$$\begin{bmatrix} p_{1,1} & \cdots & p_{1,m} & 1 & 0 & \cdots & \cdots & \cdots & 0 \\ p_{1,1} & \cdots & p_{1,m} & 0 & -1 & 0 & \cdots & \cdots & 0 \\ \vdots & & \vdots & \vdots & & & & & \vdots \\ p_{k,1} & \cdots & p_{k,m} & 0 & \cdots & \cdots & 0 & 1 & 0 \\ p_{k,1} & \cdots & p_{k,m} & 0 & \cdots & \cdots & \cdots & 0 & -1 \\ p'_{1,1} & \cdots & p'_{1,m} & 0 & \cdots & \cdots & \cdots & \cdots & 0 \\ \vdots & & \vdots & \vdots & & & & & \vdots \\ p'_{k-1,1} & \cdots & p'_{k-1,m} & 0 & \cdots & \cdots & \cdots & \cdots & 0 \\ p'_{k,1} & \cdots & p'_{k,m} & 0 & \cdots & \cdots & \cdots & \cdots & 0 \end{bmatrix} \begin{pmatrix} x_1 \\ \vdots \\ x_m \\ y_1 \\ z_1 \\ \vdots \\ y_k \\ z_k \end{pmatrix} = \begin{pmatrix} s_{1,j_1+1} + d \\ s_{1,j_1} + d \\ \vdots \\ s_{k,j_k+1} + d \\ s_{k,j_k} + d \\ s'_1 \\ \vdots \\ s'_{k'} \end{pmatrix}$$

$$s'_1 \geq 0, \ldots, s'_{k'} \geq 0$$

When such a minimum value is not present, the linear programming problem solution engine unit 12 reports such a fact that the linear programming matter is infeasible to the linear programming problem managing unit. The process operation performed at this time is to judge the feasibility about the $(j_1, \ldots, j_k)$ problem, and to solve the problem $(j_1, \ldots, j_k)$.

Figure 12:
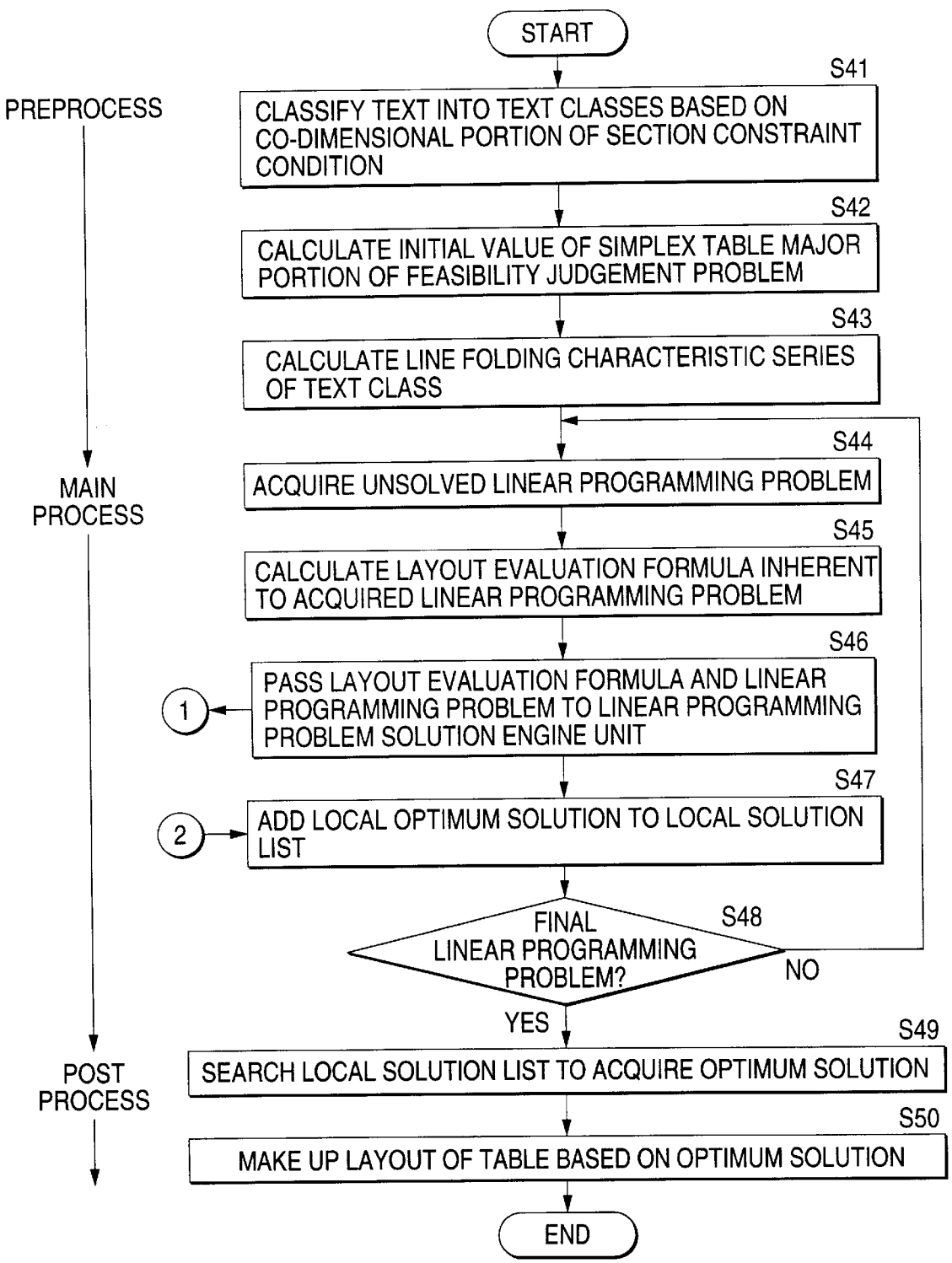
FIG. 12 is a flowchart for representing an example of overall operation of the table allocating apparatus according to the second embodiment of the present invention.

FIG. 12 is a flowchart for indicating an example of overall operations performed in the table allocating apparatus according to the second embodiment of the present invention. A text is stored into the text holding unit 1, and a connector $C=[c_{i,j}]$ is stored into the connector holding unit 2 as the initial information. Also, the common constraint condition is stored as the initial information into the common constraint condition holding unit 3.

As the reprocess, process operations defined from step S41 to step S43 are performed. At step S41, the text classifying unit 13 classifies the text held in the text holding unit 1 into the text class $C_i(1 \leq i \leq k)$ based on the co-dimensional portion of the section constraint condition. Every text class $C_i$, the co-dimensional portions $p_{i,1}x_1 + \ldots p_{i,m}x_m$ of the linear equation representing the width of the allocation box are registered together with the text class. At step S42, the initial value setting unit 15 in the simplex table major portion holding unit 14 calculates the initial value of the simplex table major portion of the above-described feasible judgement problem based upon the co-dimensional portions of the linear equation corresponding to the respective text classes classified at step S41, the connector held in the connector holding unit 2, and the common constraint conditions stored in the common constraint condition holding unit 3. Then, the calculated initial value is stored into the feasible judgement problem unit 16 together with the feasible basic index. Also, at step S43, the line folding characteristic series $s_{i,1}, \ldots, s_{i,1(i)}$ are calculated for each of the text classes $C_1$ classified at step S41 by the line folding characteristic series calculating unit 5 within the section constraint condition holding unit 4, and the calculated result is stored into the line folding characteristic series holding unit 6.

When these reprocess operations are accomplished, the process operation is advanced to the main process operation. At step S44, the linear programming problem managing unit 7 derives one line folding characteristic value $s_{i,j(i)}$ (satisfying $0 \leq j_i \leq 1_i - 1$) with regard to each of these text classes $C_i$ from the section constraint condition holding unit 4. That is, k pieces of line folding characteristic values specified by $j_1, \ldots, j_k$ are derived. Based on the respective line folding characteristic values $s_i, j_{(i)}$ and $s_i, j_{(i+1)}$, the width of the allocation box of the text class $C_i$ is limited. The range where the parameters can be established is given as follows:

$$s_{i,j(i)} \leq p_{i,1} x_1 + \ldots + p_{i,m} x_m - d \leq s_{i,j(i)+1}$$

Since such a condition formula is set as to each of these text classes, k pieces of condition formulae are specified. As a consequence, the $(j_1, \ldots, j_k)$ problem could be specified, corresponding to one of the linear programming problems. At step S45, the allocation box heights of the texts determined inherent to the $(j_1, \ldots, j_k)$ problem are passed to the layout evaluation formula calculating unit 10, so that the layout evaluation formula $v_1 x_1 + \ldots + v_m x_m$. Then, at step S46, the layout evaluation formula $v_1 x_1 + \ldots + v_m x_m$ obtained at step S45 is transferred as the objective function to the linear programming problem solution engine unit 12. Further, a series $\{s_{i,j(i)}\}_{i=1,2,\ldots,k}$ of the combinations of the line folding characteristic values about the $(j_1, \ldots, j_k)$ problem is passed to this solution engine unit 12 and a further report is waited. Thus, the process operation executed in the linear programming problem solution engine unit 12 will be discussed later.

At step S47, from the linear programming problem solution engine unit 12, either a set of parameters for giving the minimum value and the maximum value of the object function, or such information that the linear programming problem is infeasible is reported to the linear programming problem managing unit 7. This reported information is added to the local solution list stored in the local solution holding unit 8. At step S48, a judgement is made as to whether or not all of the linear programming problems have been solved. That is to say, a check is done as to whether or not all of the sets $(j_1, \ldots, j_k)$ have been processed. When the unsolved problem is lifted, the process operation is returned to step S44 at which the next set $(j_1, \ldots, j_k)$ is selected and then the specific linear programming problem is processed.

At step S48, when all of the linear programming problems have been processed, the main process is ended and the process operation is advanced to a post process. As this post process, the local solution list held in the local solution holding unit 8 is searched, so that the smallest value among the minimum values of the held object functions, and also the parameter corresponding to this smallest value and obtained. This is the optimum solution. Each of the local solutions held in the local solution list is a local solution within a range where no line folding operation occurs in the respective texts. Among them, the optimum solution is selected, so that it is possible to obtain such a solution for obtaining an optimum layout involving the line folding operation. At step S50, a layout of a table is determined based on the optimum solution acquired at step S49. As a result, an optimum table fitted to the conditions can be formed.

Figure 13:
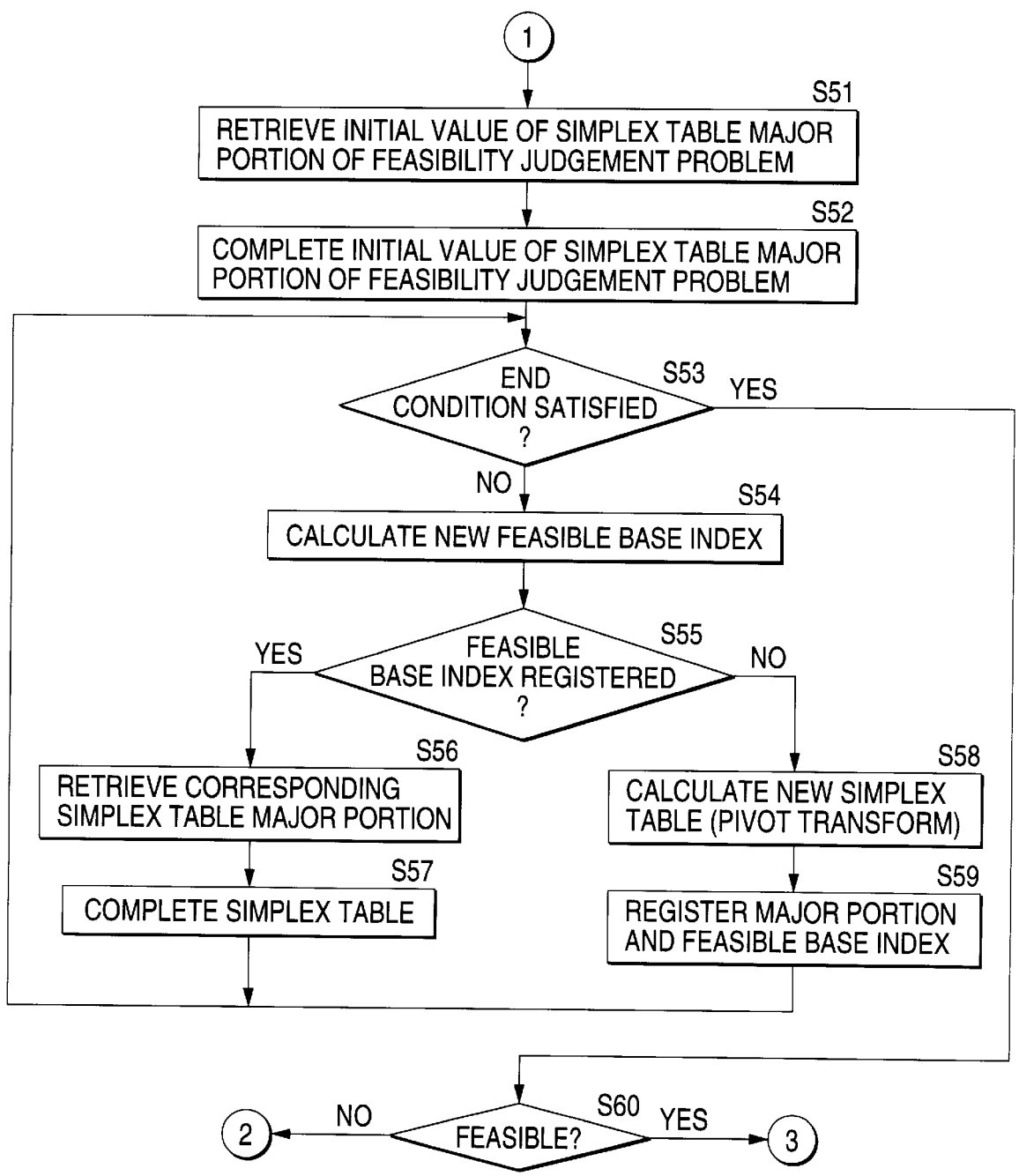
FIG. 13 is a flowchart for showing an example of an execution feasibility investigation by a linear programming problem solving engine unit employed in the table allocating apparatus according to the second embodiment of the present invention.

FIG. 13 is a flowchart for indicating an example of the feasible investigation operation by the linear programming problem solution engine unit 12 employed in the table allocating apparatus according to the second embodiment of the present invention. At step S46 of FIG. 12, the layout evaluation formula $v_1 x_1 + \ldots v_m x_m$ is passed as the objective function from the linear programming problem managing unit 7, and also the series $\{s_{i,j(i)}, s_{i,j(i)+1}\}_{i=1,2,\ldots,k}$ of combinations of the line folding characteristic values about the $(j_1, \ldots, j_k)$ problem is passed to the linear programming problem solution engine unit 12. The linear programming problem solution engine unit 12 first judges feasibility of the $(j_1, \ldots, j_k)$ problem.

At step S51, the initial value of the major portion of the simplex table for investigating feasibility is acquired from the feasibility judgement problem unit 16 within the simplex table major unit holding unit 14. The initial value of the major portion of the simplex table is the below-mentioned matrix of (2k+k') rows m+4k+k' columns, and is searched while using the feasible basic index (m+2k+1, ..., m+4k+k') as a key, which may be referred:

$$\begin{bmatrix} p_{1,1} & \cdots & p_{1,m} & 1 & 0 & \cdots & \cdots & 0 & 1 & 0 & & \cdots & \cdots & \cdots & \cdots & \cdots & 0 \\ p_{1,1} & \cdots & p_{1,m} & 0 & -1 & 0 & \cdots & 0 & 0 & 1 & 0 & & \cdots & \cdots & \cdots & 0 \\ \vdots & & \vdots & & & & & \vdots & & & & & & & & \vdots \\ p_{k,1} & \cdots & p_{k,m} & 0 & \cdots & 0 & 1 & 0 & 0 & \cdots & & 0 & 1 & 0 & \cdots & \cdots & 0 \\ p_{k,1} & \cdots & p_{k,m} & 0 & \cdots & \cdots & 0 & -1 & 0 & \cdots & & 0 & 1 & 0 & \cdots & \cdots & 0 \\ p'_{1,1} & \cdots & p'_{1,m} & 0 & \cdots & \cdots & \cdots & 0 & 0 & \cdots & \cdots & \cdots & 0 & 1 & 0 & \cdots & 0 \\ \vdots & & \vdots & & & & & & & & & & & & & & \vdots \\ p'_{k'-1,1} & \cdots & p'_{k'-1,m} & 0 & \cdots & \cdots & \cdots & 0 & 0 & \cdots & \cdots & \cdots & \cdots & & 0 & 1 & 0 \\ p'_{k',1} & \cdots & p'_{k',m} & 0 & \cdots & \cdots & \cdots & 0 & 0 & \cdots & \cdots & \cdots & \cdots & & & 0 & 1 \end{bmatrix}$$

At step S52, the (2k+k'+1)-th row and the (m+4k+k'+1)-th column are added to the initial value of the major portion of the simplex table obtained at the simplex table obtained at step S51 thereby completing a simplex table. The (2k+k'+1)-th row corresponds to such a (m+4k+k')-th row vector that the first (m+2k) pieces of the value of the element is 0, and the last (2k+k') pieces of the value of the element is 1;

$$(0, \ldots, 0, 1, \ldots, 1)$$

On the other hand, the (m+4k+k'+1)-th column to be added corresponds to the (2k+k++1)-th column vector produced from a series $[s_{i,j(i)}, s_{i,j(i)+1}]_{i=1,2,\ldots,k}$ of combinations of the line folding characteristic values about the $(j_1, \ldots, j_k)$ problem passed from the linear programming problem managing unit 7, namely:

$$\begin{pmatrix} s_{1,j_1+1} + d \\ s_{1,j_1} + d \\ \vdots \\ s_{k,j_k+1} + d \\ s_{k,j_k} + d \\ s'_1 \\ \vdots \\ s'_k \\ 0 \end{pmatrix}$$

At step S53, a check is done as to whether or not the present feasible basic index and simplex table can satisfy the ending condition (simplex base I or simplex base II). If they do not satisfy the ending condition, then a feasible basic index and a simplex table are newly calculated. According to the new calculation about the feasible basic index and the simplex table, first, at step S54, a new feasible basic index is calculated based on the simplex base III. The feasible basic index is a set of (2k+k') pieces of elements, which are constructed of the natural number smaller than (m+4k+k+). At step S55, a check is done as to whether or not the newly calculated feasible basic index has been registered into the feasible judgement problem unit 16 contained in the simplex table major portion holding unit 14. If this newly calculated feasible basic index has been registered, then the major portion of the simplex table is retrieved while the feasible basic index registered at step S56 is used as the key. Thus, the major portion of the original simplex table is substituted by the obtained major portion. Thereafter, at step S57, both components of the simplex table in the rightmost column and the lower most row are properly swept out, so that a simplex table corresponding to the new feasible basic index is obtained. At step S55, if the feasible basic index is not registered into the feasible judgement problem unit 16 employed in the simplex table major portion holding unit 14, then the overall simplex table is pivot-transformed to thereby obtain a new simplex table at step S58. Thereafter, further, both the feasible basic index obtained at step S54 and the major portion of the simplex table newly calculated at step S58 are registered into the feasible judgement problem unit 16 contained in the simplex table major portion holding unit 14. The above-described procedures defined from step S53 to step S59 are repeated until the ending condition (either simplex base I or simplex base II) can be satisfied. Since the above-explained simplex base I, simplex base II and simplex base III are well employed in the conventional judgement/calculation of the simplex method, no explanation thereof is made in this specification.

At step S53, when it is so judged that both the feasible basic index and the simplex table satisfy the ending condition (simplex base I), another judgement is made at step S60 as to whether or not the $(j_1, \ldots, j_k)$ problem is feasible from the feasible basic index and the simplex table. When a summation of values of artificial variables (namely, parameters from (m+2k+1)th to (m+4k+k')th) is not equal to 0, the $(j_1, \ldots, j_k)$ problem is infeasible. The linear programming problem engine unit 12 informs such a fact that the problem is infeasible to the linear programming problem managing unit 7, and returns a control. When all of the values of the artificial variables are equal to 0, the $(j_1, \ldots, j_k)$ problem is infeasible. Subsequently, the linear programming problem solution engine unit 12 solves the $(j_1, \ldots, j_k)$ problem.

Figure 14:
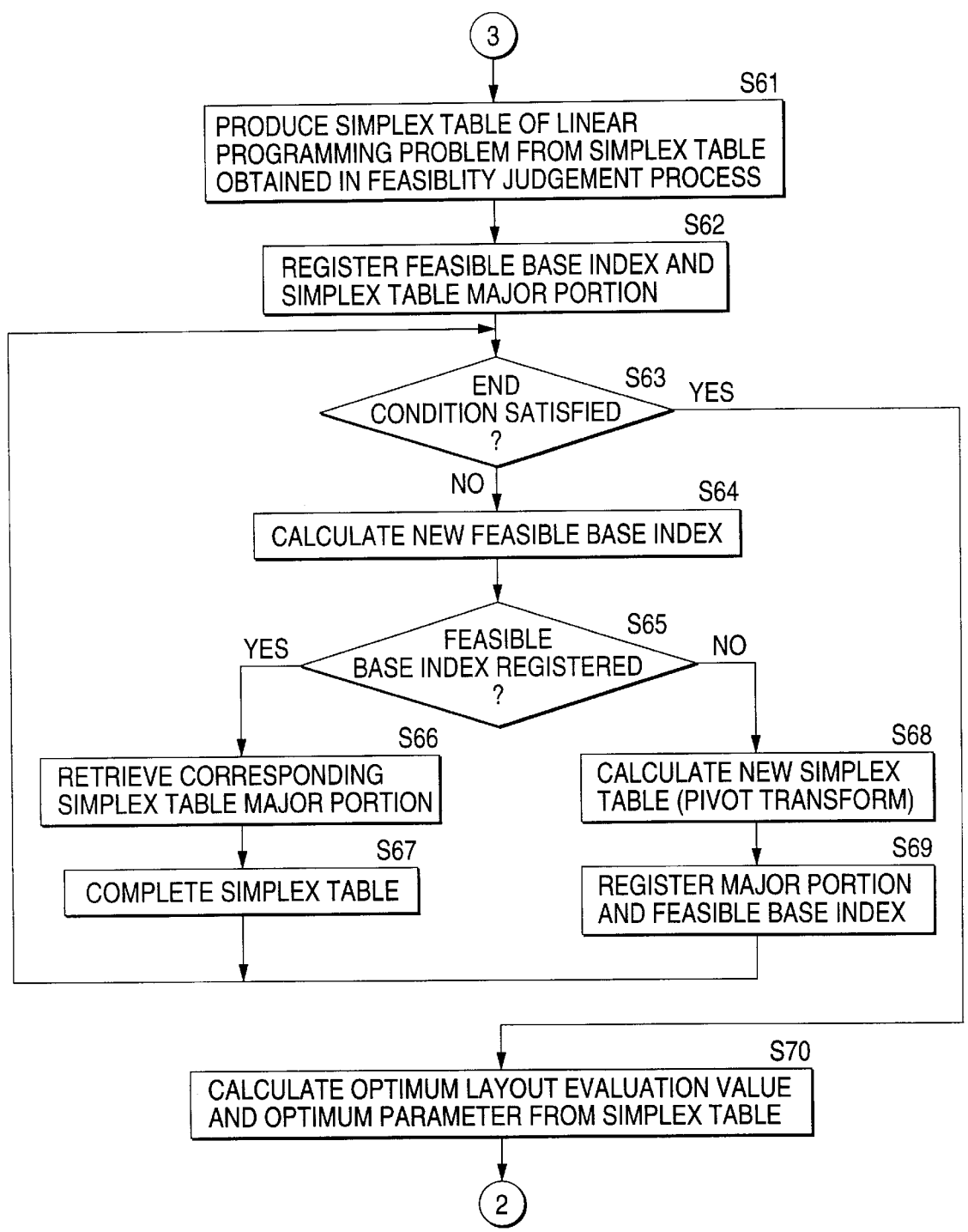
FIG. 14 is a flowchart for showing an example of a linear programming problem solution by the linear programming problem solving engine unit employed in the table allocating apparatus according to the second embodiment of the present invention.

FIG. 14 is a flowchart for representing an example of the linear programming problem solving operation performed in the linear programming problem solution engine unit 12 employed in the table allocating apparatus according to the second embodiment of the present invention. When it is so judged that the problem is feasible by the judgement of the feasibility shown in FIG. 13, the $(j_1, \ldots, j_k)$ problem is solved.

At step S61, the feasible base for the $(j_1, \ldots, j_k)$ problem is searched, and the corresponding simplex table is calculated. From the simplex table obtained from the process shown in FIG. 13, the lowermost line, and the columns from the (m+2k+1)th column to the (m+4k+k')th column are removed. Moreover, to the lowermost line, the (m+2k+1)th row vector of $(v_1, \ldots, v_m, 0, \ldots, 0)$ is added which employs the layout evaluation formula of $v_1, \ldots, v_m$ which is calculated in the layout evaluation formula calculating unit 10. Subsequently, only such elements whose values are lower than (m+2k) are collected from the feasible basic index obtained from the process operation shown in FIG. 13, and the feasible basic index of the $(j_1, \ldots, j_k)$ problem containing these elements is obtained by employing the sweeping method. After the feasible basic index has been obtained, the simplex table belonging to the obtained feasible base is calculated by removing such rows whose elements are 0 from the matrix. At this time, a partial matrix obtained by removing the lowermost row and the rightmost column from the simplex table corresponds to the major portion.

At step S62, if the feasible basic index obtained at step S61 is not registered into the linear programming problem unit 17 employed in the simplex table major portion holding unit 14, then both of the feasible basic index obtained at step S61 and the major portion of the simplex table (a partial matrix in which a lowermost row and a rightmost column are removed from a simplex table) calculated are registered into the linear programming problem unit 17 in the simplex table major portion holding unit 14.

At step S63, a check is done as to whether or not the feasible basic index and the simple table satisfy the ending condition (simplex base I). If they do not satisfy the ending condition, then the feasible basic index and the simplex table are newly calculated at step S64, or step S69. It should be noted since the convex polyhedron inherent to the respective linear programming problems is finitive, the simplex base II is not required to be checked.

First of all, at step S64, a new feasible basic index is calculated in accordance with the simplex base III. At step S65, a judgement is made as to whether or not this feasible basic index has been registered into the linear programming problem 17 contained in the simplex table major portion holding unit 14. If the feasible basic index is registered, then the process operation is advanced to step S66 at which the major portion of the simplex table is retrieved while using this feasible basic index as a key, and then the major portion of the original simplex table is substituted by the obtained major portion. Thereafter, at step S67, a simplex table corresponding to the new feasible basic index is obtained by properly sweeping out the components of the simplex table at the rightmost row and th lowermost column.

At step S65, conversely, when no feasible basic index is registered into the linear programming problem unit 17 employed in the simplex table major portion holding unit 14, the process operation is advanced to step S68. At step S68, the entire simplex table is pivot-transformed to calculate a new simplex table. Thereafter, further, at step S69, both of the feasible basic index calculated at step S64 and the major portion of the simplex table newly calculated at step S68 are registered into the linear programming problem unit 17 employed in the simplex table major portion holding unit 14.

The procedure defined from step S63 to step S69 is repeated until the ending condition (simplex base I) is satisfied.

At step S63, when the feasible basic index and the simplex table satisfy the ending condition (simplex base I), the process operation is advanced to step S70. At step S70, based on the feasible basic index and the simplex table, both of an optimum layout evaluation value (minimum value of objective function) and an optimum solution (combination of values of parameters for giving minimum value to objective function are calculated, and a control is returned together with these calculation results to the linear programming problem managing unit 7.

In the linear programming problem managing unit 7, the value (a combination between a minimum value of an objective function and a parameter for applying a minimum value, or a signal for indicating that linear programming problem is infeasible) returned from the linear programming problem solution engine unit 12 is added to the list contained in the local solution holding unit. After the above-described process operation of the linear programming problem solution engine unit 12 has been executed as to all the problems of $(j_1, \ldots, j_k)$, the minimum value of the objective function and the corresponding optimum parameter are acquired from the list, and then the layout of the table is determined from the resulting optimum parameter.

As described above, the major portion of the simplex table which is held in the simplex table major portion holding unit at step S56 in FIG. 13 and at step S66 in FIG. 14, is employed, so that the time required to perform the calculation of the pivot transformation can be shortened, and therefore the process efficiency can be increased.

Figure 15:
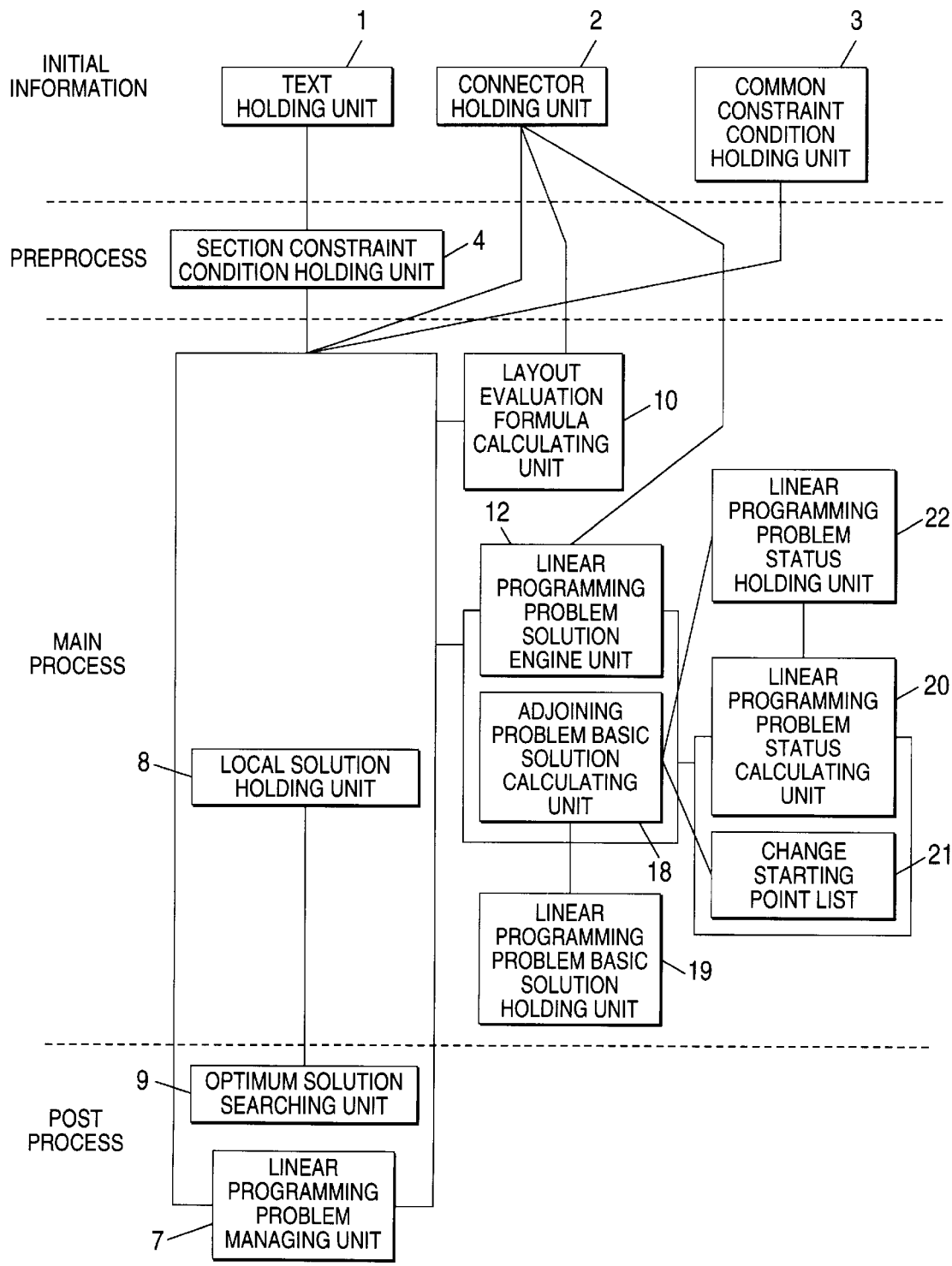
FIG. 15 is a schematic diagram for indicating an arrangement of a table allocating apparatus according to a third embodiment of the present invention.

FIG. 15 schematically shows an arrangement of a table allocating apparatus according to a third embodiment of the present invention. It should be noted that the same reference numerals shown in FIG. 1 will be employed as those for indicating the same or similar elements of FIG. 15, and no explanations thereof are made. Reference numeral 18 designates an adjoining problem basic solution calculating unit; 19, a linear programming problem basic solution holding unit; 20, a linear programming problem status calculating unit; 21, a change starting point list; and 22, a linear programming problem status holding unit. In the above-described first embodiment, an extremely large number of linear programming problems must be solved so as to obtain a single table with a layout. This may cause difficulty in efficiency. According to the second embodiment, since a major portion of a simplex table is held, the process efficiency could be improved. In this third embodiment, the linear programming problem solution engine unit 12 includes the adjoining problem basic solution calculating unit 18, and further the neighbor basic solution holding unit 19 is employed. The linear programming problem status calculating unit 20 and the linear programming problem status holding unit 22 are employed so as to further increase the process efficiency. Also, it is of course possible to perform a process operation for each of text classes with employment of the text classifying unit 13 shown in the second embodiment, and in combination with the simplex table major portion holding unit 14.

It is assumed that when the $(j_1, \ldots, j_k)$ problem is tried to be solved, a feasible base (J) and a basic solution ($\xi_X$) are obtained in which $X \in \Omega$. Here, the constraint condition of the $(j_1, \ldots, j_k)$ problem is given in the form of:

$$\begin{bmatrix} p_{1,1} & \cdots & p_{1,m} & 1 & 0 & \cdots & \cdots & \cdots & 0 \\ p_{1,1} & \cdots & p_{1,m} & 0 & -1 & 0 & \cdots & \cdots & 0 \\ \cdot & & \cdot & \cdot & & & & & \cdot \\ \cdot & & \cdot & \cdot & & & & & \cdot \\ p_{k,1} & \cdots & p_{k,m} & 0 & \cdots & \cdots & 0 & 1 & 0 \\ p_{k,1} & \cdots & p_{k,m} & 0 & \cdots & \cdots & \cdots & 0 & -1 \\ p'_{1,1} & \cdots & p'_{1,m} & 0 & \cdots & \cdots & \cdots & \cdots & 0 \\ \cdot & & \cdot & \cdot & & & & & \cdot \\ \cdot & & \cdot & \cdot & & & & & \cdot \\ p'_{k-1,1} & \cdots & p'_{k-1,m} & 0 & \cdots & \cdots & \cdots & \cdots & 0 \\ p'_{k,1} & \cdots & p'_{k,m} & 0 & \cdots & \cdots & \cdots & \cdots & 0 \end{bmatrix} \begin{pmatrix} x_1 \\ \cdot \\ \cdot \\ \cdot \\ x_m \\ y_1 \\ z_1 \\ \cdot \\ \cdot \\ \cdot \\ y_k \\ z_k \end{pmatrix} = \begin{pmatrix} s_{1,j_1+1} + d \\ s_{1j_1} + d \\ \cdot \\ \cdot \\ \cdot \\ s_{k,j_k+1} + d \\ s_{k,j_k} + d \\ s'_1 \\ \cdot \\ \cdot \\ s'_{k'} \end{pmatrix}$$

$s'_1 \geq 0, \ldots, s'_{k'} \geq 0$

It is obtained:

$\Omega = \{x_1, \ldots, x_m, y_1, z_1, \ldots, y_k, z_k\}, J \subset \Omega$

A column vector corresponding to variable $X \in \Omega$ is expressed as $v_x$, which is contained in the below-mentioned matrix:

$$\begin{bmatrix} p_{1,1} & \cdots & p_{1,m} & 1 & 0 & \cdots & \cdots & \cdots & 0 \\ p_{1,1} & \cdots & p_{1,m} & 0 & -1 & 0 & \cdots & \cdots & 0 \\ \cdot & & \cdot & \cdot & & & & & \cdot \\ \cdot & & \cdot & \cdot & & & & & \cdot \\ p_{k,1} & \cdots & p_{k,m} & 0 & \cdots & \cdots & 0 & 1 & 0 \\ p_{k,1} & \cdots & p_{k,m} & 0 & \cdots & \cdots & \cdots & 0 & -1 \\ p'_{1,1} & \cdots & p'_{1,m} & 0 & \cdots & \cdots & \cdots & \cdots & 0 \\ \cdot & & \cdot & \cdot & & & & & \cdot \\ \cdot & & \cdot & \cdot & & & & & \cdot \\ p'_{k-1,1} & \cdots & p'_{k-1,m} & 0 & \cdots & \cdots & \cdots & \cdots & 0 \\ p'_{k,1} & \cdots & p'_{k,m} & 0 & \cdots & \cdots & \cdots & \cdots & 0 \end{bmatrix}$$

In other words, symbol $v_{x(i)}$ indicates the i-th column, symbol $v_{y(i)}$ indicates the (m+2i-1)th column, and symbol $v_{z(i)}$ indicates the (m+2i)th column.

(J) is equal to the feasible base, which implies that $(v_x)$ $(X \in J)$ corresponds to a linear space defined by $(v_x)$ $(X \in \Omega)$, and the below-mentioned corresponding basic resolution is present:

$$\xi_x \begin{cases} \geq 0 & \text{if } X \in J, \\ = 0 & \text{if } X \in \Omega \backslash J. \end{cases}$$

Also, the following constraint condition is satisfied:

$$\begin{bmatrix} p_{1,1} & \cdots & p_{1,m} & 1 & 0 & \cdots & \cdots & \cdots & 0 \\ p_{1,1} & \cdots & p_{1,m} & 0 & -1 & 0 & \cdots & \cdots & 0 \\ \vdots & & \vdots & \vdots & & & & & \vdots \\ p_{k,1} & \cdots & p_{k,m} & 0 & \cdots & \cdots & 0 & 1 & 0 \\ p_{k,1} & \cdots & p_{k,m} & 0 & \cdots & \cdots & \cdots & 0 & -1 \\ p'_{1,1} & \cdots & p'_{1,m} & 0 & \cdots & \cdots & \cdots & \cdots & 0 \\ \vdots & & \vdots & \vdots & & & & & \vdots \\ p'_{k'-1,1} & \cdots & p'_{k'-1,m} & 0 & \cdots & \cdots & \cdots & \cdots & 0 \\ p'_{k',1} & \cdots & p'_{k',m} & 0 & \cdots & \cdots & \cdots & \cdots & 0 \end{bmatrix} \begin{pmatrix} x_1 \\ \vdots \\ x_m \\ y_1 \\ z_1 \\ \vdots \\ y_k \\ z_k \end{pmatrix} = \begin{pmatrix} s_{1,j_1+1} + d \\ s_{1,j_1} + d \\ \vdots \\ s_{k,j_k+1} + d \\ s_{k,j_k} + d \\ s'_1 \\ \vdots \\ s'_{k'} \end{pmatrix}$$

$s'_1 \geq 0, \ldots, s'_{k'} \geq 0$

It should be noted that with respect to the feasible base, the corresponding basic solution owns one meaning.

At this time, the below-mentioned characteristic can be satisfied:

(1) When $\xi_{y(i)}=0$ is satisfied, the $(j_1, \ldots, j_{i-1}, j_i+1, j_{i+1}, \ldots, j_k)$ problem is feasible, and the following can be satisfied.

If $J \ni y_i$, then $(J)$ is a feasible base.
If $\Omega \backslash J \ni y_i$, then $(J \cup \{y_i\} \backslash \{z_i\})$ is a feasible base.
$(\xi'_x)$ $(X \in \Omega)$ is a basic solution.

$$\xi'x = \begin{cases} s_{i,j_i+2} - s_{i,j_i+1} & \text{if } X = y_i, \\ 0 & \text{if } X = z_i, \\ \xi_x & \text{otherwise.} \end{cases}$$

At this time, it is called that the $(j_1, \ldots, j_{i-1}, j_i+1, j_{i+1}, \ldots, j_k)$ problem is adjacent to the $(j_1, \ldots, j_{i-1}, j_i, j_{i+1}, \ldots, j_k)$ problem with sandwiching the feasible base (J).

(2) When $\xi_{z(i)}=0$ is satisfied, the $(j_1, \ldots, j_{i-1}, j_i-1, j_{i+1}, \ldots, j_k)$ problem is feasible, and the following condition can be satisfied:

If $J \ni z_i$, then $(J)$ is a feasible base.
If $\Omega \backslash J \ni y_i$, then $(J \cup \{z_i\} \backslash \{y_i\})$ is a feasible base.
$(\xi'_x)$ $(X \in \Omega)$ is a basic solution.

$$\xi'x = \begin{cases} 0 & \text{if } X = y_i, \\ s_{i,j_i} - s_{i,j_i-1} & \text{if } X = z_i, \\ \xi_x & \text{otherwise.} \end{cases}$$

At this time, it is called that the $(j_1, \ldots, j_{i-1}, j_i-1, j_{i+1}, \ldots, j_k)$ problem is adjacent to the $(j_1, \ldots, j_{i-1}, j_i, j_{i+1}, \ldots, j_k)$ problem with sandwiching the feasible base (J).

Every time linear programming problem solution engine unit 12 calculates the feasible base and the basic solution of the linear programming problem, the adjoining problem base calculating unit 18 checks whether or not the linear programming problems which adjoin to each other and sandwich this feasible base have already been held in the linear programming problem basic solution holding unit 19. When the linear programming problems have not yet been held, the feasible base and the basic solution of these linear programming problems are calculated in accordance with the above-described characteristic, and the calculation results are registered into the linear programming problem basic solution holding unit 19.

When the linear programming problem is newly solved by the linear programming problem solution engine unit 12, a check is done as to whether or not this linear programming problem has been registered into the linear programming problem basic solution holding unit 19. If the linear programming problem is registered, then the registered feasible base and basic solution are used to commence the calculation. As a result, both of the feasibility judging step and the step for searching the initial feasible base, which are performed in the linear programming problem solution engine unit 12, (for instance, all steps of the second embodiment shown in FIG. 13, and step S61 shown in FIG. 14) can be omitted.

With respect to the $(j_1, \ldots, j_k)$ problem, the linear programming problem basic solution holding unit 19 holds the feasible base, the basic solution, and the simplex table major portion belonging to the feasible base with keeping the correspondence. The simplex table major portion belonging to the feasible base corresponds to such a matrix of r row 2k+m column which is obtained by base-transforming the below-mentioned constraint condition matrix of the $(j_1, \ldots, j_k)$ problem as to the base $(v_x)$ $(x \in j)$:

$$\begin{bmatrix} p_{1,1} & \cdots & p_{1,m} & 1 & 0 & \cdots & \cdots & \cdots & 0 \\ p_{1,1} & \cdots & p_{1,m} & 0 & -1 & 0 & \cdots & \cdots & 0 \\ \vdots & & \vdots & \vdots & & & & & \vdots \\ p_{k,1} & \cdots & p_{k,m} & 0 & \cdots & \cdots & 0 & 1 & 0 \\ p_{k,1} & \cdots & p_{k,m} & 0 & \cdots & \cdots & \cdots & 0 & -1 \\ p'_{1,1} & \cdots & p'_{1,m} & 0 & \cdots & \cdots & \cdots & \cdots & 0 \\ \vdots & & \vdots & \vdots & & & & & \vdots \\ p'_{k'-1,1} & \cdots & p'_{k'-1,m} & 0 & \cdots & \cdots & \cdots & \cdots & 0 \\ p'_{k',1} & \cdots & p'_{k',m} & 0 & \cdots & \cdots & \cdots & \cdots & 0 \end{bmatrix}$$

Assuming now that $J=(X_1, \ldots, X_r)$, $q_{i,j}$ corresponds to the relative component for the column vector $v_{x(i)}$ of the j-the column vector $v_j$ contained in the original constraint condition matrix. In other words, the following linear combination can be satisfied:

$v_j = q_{i,j} v_{x(1)} + \cdots + q_{r,j} v_{x(r)}$

Here, symbol "r" is a rank of the above-described constraint condition matrix. Assuming now that the column vector equal to the right hand (namely, the non-co-dimensional portion of the simplex table) in the constraint condition is expressed as the linear combination of the base $(v_x)$ $(X \in J)$:

$$\begin{pmatrix} s_{1,j_1+1} + d \\ s_{1j_1} + d \\ \vdots \\ s_{k,j_k+1} + d \\ s_{kj_k} + d \\ s'_1 \\ \vdots \\ s'_k \end{pmatrix} = b_1 v x_1 + \ldots + b_r v x_r$$

the simultaneous linear equation of:

$$\begin{bmatrix} q_{1,1} & \cdots & q_{1,2k+m} \\ \vdots & & \vdots \\ q_{r,1} & \cdots & q_{r,2k+m} \end{bmatrix} \begin{pmatrix} x_1 \\ \vdots \\ x_m \\ y_1 \\ z_1 \\ \vdots \\ y_k \\ z_k \end{pmatrix} = \begin{pmatrix} b_1 \\ \vdots \\ b_r \end{pmatrix}$$

given a constraint condition equivalent to the original constraint condition:

$$\begin{bmatrix} p_{1,1} & \cdots & p_{1,m} & 1 & 0 & \cdots & \cdots & \cdots & 0 \\ p_{1,1} & \cdots & p_{1,m} & 0 & -1 & 0 & \cdots & \cdots & 0 \\ \vdots & & \vdots & \vdots & & & & & \vdots \\ p_{k,1} & \cdots & p_{k,m} & 0 & \cdots & \cdots & 0 & 1 & 0 \\ p_{k,l} & \cdots & p_{k,m} & 0 & \cdots & \cdots & \cdots & 0 & -1 \\ p'_{1,1} & \cdots & p'_{1,m} & 0 & \cdots & \cdots & \cdots & \cdots & 0 \\ \vdots & & \vdots & \vdots & & & & & \vdots \\ p'_{k-1,1} & \cdots & p'_{k-1,m} & 0 & \cdots & \cdots & \cdots & \cdots & 0 \\ p'_{k,1} & \cdots & p'_{k,m} & 0 & \cdots & \cdots & \cdots & \cdots & 0 \end{bmatrix} \begin{pmatrix} x_1 \\ \vdots \\ x_m \\ y_1 \\ z_1 \\ \vdots \\ y_k \\ z_k \end{pmatrix} = \begin{pmatrix} s_{1,j_1+1} + d \\ s_{1j_1} + d \\ \vdots \\ s_{k,j_k+1} + d \\ s_{kj_k} + d \\ s'_1 \\ \vdots \\ s'_k \end{pmatrix} \quad s'_1 \geq 0, \ldots, s'_k \geq 0$$

Each of the $(j_1, \ldots, j_m)$ problems owns the following characteristics. The below-mentioned characteristics can be established as to the two linear programming problems, i.e., $(j_1, \ldots, j_{i-1}, j_i, j_{i+1}, \ldots, j_k)$ problem and $(j_1, \ldots, j_{i-1}, j'_i, j_{i+1}, \ldots, j_k)$ whose line folding conditions related to a specific text to are different from each other. It should be understood that $j_i < j'_i$ can be satisfied.

(1) When both of the two problems:
$(j_1, \ldots, j_{i-1}, j_1, j_{i+1}, \ldots, j_k)$ and $(j_1, \ldots, j_{i-1}, j'_1, j_{i+1}, \ldots, j_k)$ are feasible, the $(j_1, \ldots, j_{i-1}, j, j_{i+1}, \ldots, j_k)$ problem is feasible with respect to an arbitrary condition of $j_i \leq j \leq j'_i$.

(2) When the $(j_1, \ldots, j_{i-1}, j_i, j_{i+1}, \ldots, j_k)$ problem is feasible and the $(j_1, \ldots, j_{i-1}, j'_1, j_{i+1}, \ldots, j_k)$ problem is infeasible, the $(j_1, \ldots, j_{i-1}, j, j_{i+1}, \ldots, j_k)$ problem is infeasible with respect to an arbitrary condition of $j \geq j_i$.

(3) When the $(j_1, \ldots, j_{i-1}, j_1, j_{i+1}, \ldots, j_k)$ problem is infeasible, and the $(j_1, \ldots, j_{i-1}, j'_i, j_{i+1}, 2, j_k)$ problem is feasible, the $(j_1, \ldots, j_{i-1}, j_i, j_{i+1}, \ldots, j_k)$ problem is infeasible as to an arbitrary condition of $j \leq j_i$.

Every time the linear programming problem solution engine unit 12 judges the feasibility of the linear programming problems, such a status for instructing any one of "feasible" and "infeasible" is registered into the linear programming problem status holding unit 22 in correspondence with the linear programming problem in response to the judgement result.

The linear programming problem status calculating unit 20 calculates its status by registering the status of a certain linear programming problem as to all of the linear programming problems capable of judging its feasibility from the above-mentioned characteristics (1) to (3), and then registers the calculation result. At this time, change starting point list 21 is employed. In this change starting point list 21, the $(j_1, \ldots, j_k)$ problem where it could be newly recognized "feasible", or "infeasible" is registered.

When the feasibility is judged by the linear programming problem status calculating unit 20, and there is such a linear programming problem to which the status of any one of "feasible" and "infeasible" is newly added, this status of the linear programming problem is registered, os that the linear programming problem whose feasibility can be judged might be further present. the linear programming problem repeats the above-described procedure until such a linear programming problem is not present.

The linear programming problem status holding unit 22 holds therein such statuses for instructing, for instance, "feasible", "infeasible", and "unknown feasibility" with respect to each of these linear programming problems conducted from the combinations of the constraint conditions held in the section constraint condition holding unit 7. Otherwise, in addition thereto, the linear programming problem status holding unit 22 holds other statuses for instructing "solved out" and "basic solution is given".

In combination with this linear programming problem status holding unit 22 and the linear programming problem status calculating unit 20, the feasibility about a portion of the linear programming problems can be known without employing the program of the linear programming. In particular, the linear programming problem managing unit 7 proceeds with the process operation while the linear programming problem to which such a status for instructing "infeasible" has been applied is excluded by the linear programming problem status calculating unit 20, so that the efficiency of the process operation can be improved.

The content of the status for the linear programming problem may be set more in detail. For example, as the status of the linear programming problem, such statuses for instructing "solved out", and "basic solution is given" in addition to "feasible", "infeasible" and "feasibility is unknown".

The linear programming problem to which the status indicative of "feasible" has been set corresponds to such a linear programming problem calculated from the status of other linear programming problem by the linear programming problem status calculating unit 20, but this feasibility is not judged by the process of the linear programming. The linear programming problem to which the status for indicating "basic solution is given" has been set corresponds to such a linear programming problem in which the feasible base and the basic solution of this linear programming problem are calculated from the feasible bases and the basic solutions of the adjoining linear programming problems by the adjoining problem basic solution calculating unit 18. Also, the linear programming problem to which such a status for representing "infeasible" has been set corresponds to such a linear programming problem that the feasibility thereof has been judged by employing the linear programming, or has been calculated from the status of another linear programming problem by the linear programming problem status calculating unit. When the feasible linear programming problem is solved by the linear programming problem solution engine unit, the status of this linear programming problem is set to "solved out".

The linear programming problem managing unit 7 may increase the efficiency of the process operation by selecting the linear programming problem as follows:

(1) When there is such a linear programming problem to which a status indicative of "basic solution is given" has been set, this is acquired.

(2) When there is no such a linear programming problem to which a status indicative of "basic solution is given" has been set, if there is such a linear programming problem to which such a status indicative of "feasible" has been set, then it is acquired.

(3) When there is no such a linear programming problem to which statuses indicative of "basic solution is given" and "feasible" have been set, the linear programming problem indicative of "feasibility is unknown" is acquired.

Since the process for judging the feasibility of the program of the linear programming can be omitted, the linear programming problem to which such a status for showing "basic solution is given" has been set can obtain the solution at a higher efficiency. Since the basic solutions of the adjoining linear programming problems are obtained from the basic solution obtained during the calculation, the linear programming problem to which such a status indicative of "basic solution is given" has been set is solved at a top priority, so that the efficiency to solve other linear programming problems can be improved. This result becomes linkage. In other words, there is such an effect that the linear programming problem to which the status for indicating "basic solution is given" has been set is increased by solving the linear programming problem to which the status indicative of "basic solution is given" has been set.

The linear programming problem to which the status for denoting "feasible" has been set is different from the linear programming problem to which the status for indicating "basic solution is given", and must execute all the steps contained in the program of the linear programming so as to solve the problem thereof. However, in view of such a point that the basic solutions of the adjoining linear programming problems are given, this linear programming problem is similar to such a case to solve the linear programming problem to which the status for representing "basic solution is given" has been set. As a consequence, there is another merit that the linear programming problem to which the status indicative of "basic solution is given" has been set is increased in the linkage form by solving the linear programming problem to which the status for denoting "basic solution is given" has been set at a top priority.

As described above, in response to the status stored in the linear programming problem status holding unit 22, the linear programming problem managing unit 7 can improve the efficiency of the process operation by selecting the linear programming problem to be passed to the linear programming problem engine unit 12.

Referring now to FIG. 15, an example of operation by the table allocating apparatus according to the third embodiment of the present invention will be described. An overall operation of this third embodiment is substantially same as that of the first embodiment and the second embodiment. The different operation is such that in the operations of the linear programming problem managing unit 7 and the linear programming problem engine unit 12, there are employed the linear programming problem basic solution holding unit 19, the linear programming problem status calculating unit 20, and the linear programming problem status holding unit 22.

In the following description, the linear programming problem status holding unit 22 holds any one of these statuses "UNKNOWN", "FEASIBLE", "INFEASIBLE", "READY" and "SOLVED" with respect to the respective "$j_1, \ldots, j_k$" problems with keeping correspondence between them. These statuses correspond to each of the above-explained statuses "feasibility is unknown", "feasible", "infeasible", "basic solution is given" and "solved out". Under the initial condition, the statuses of all problems are "UNKNOWN". The status of the linear programming problem held in the linear programming problem basic solution holding unit 19 corresponds to any one of "READY" or "SOLVED".

The initial information held in the text holding unit 1, the connector holding unit 2, and the common constraint condition holding unit 3 is the same as in the first embodiment. Furthermore, the preprocessing operation performed by the section constraint condition holding unit 4 is identical to that of the first embodiment.

Similar to the first embodiment, the linear programming problem managing unit 7 specified the $(j_1, \ldots, j_k)$ problem, and passes the allocation box height of each text, inherent to the $(j_1, \ldots, j_k)$ problem, to the layout evaluation formula calculating unit 10, so that the layout evaluation formula $v_1 x_1 + \ldots v_m x_m$. While the obtained layout evaluation formula is used as the objective function; the $(j_1, \ldots, j_k)$ problem is passed to the linear programming problem solution engine unit 12 for solution. In this problem, such a linear equation indicated in the below-mentioned form is employed as the constraint condition:

$$\begin{bmatrix} p_{1,1} & \cdots & p_{1,m} & 1 & 0 & \cdots & \cdots & \cdots & 0 \\ p_{1,1} & \cdots & p_{1,m} & 0 & -1 & 0 & \cdots & \cdots & 0 \\ \vdots & & \vdots & \vdots & & & & & \vdots \\ p_{k,1} & \cdots & p_{k,m} & 0 & \cdots & \cdots & 0 & 1 & 0 \\ p_{k,1} & \cdots & p_{k,m} & 0 & \cdots & \cdots & \cdots & 0 & -1 \\ p'_{1,1} & \cdots & p'_{1,m} & 0 & \cdots & \cdots & \cdots & \cdots & 0 \\ \vdots & & \vdots & \vdots & & & & & \vdots \\ p'_{k-1,1} & \cdots & p'_{k-1,m} & 0 & \cdots & \cdots & \cdots & \cdots & 0 \\ p'_{k,1} & \cdots & p'_{k,m} & 0 & \cdots & \cdots & \cdots & \cdots & 0 \end{bmatrix} \begin{pmatrix} x_1 \\ \vdots \\ x_m \\ y_1 \\ z_1 \\ \vdots \\ y_k \\ z_k \end{pmatrix} = \begin{pmatrix} s_{1,j_1+1} + d \\ s_{1,j_1} + d \\ \vdots \\ s_{k,j_k+1} + d \\ s_{k,j_k} + d \\ s'_1 \\ \vdots \\ s'_{k'} \end{pmatrix} \quad s'_1 \geq 0, \ldots, s'_{k'} \geq 0$$

Figure 16:
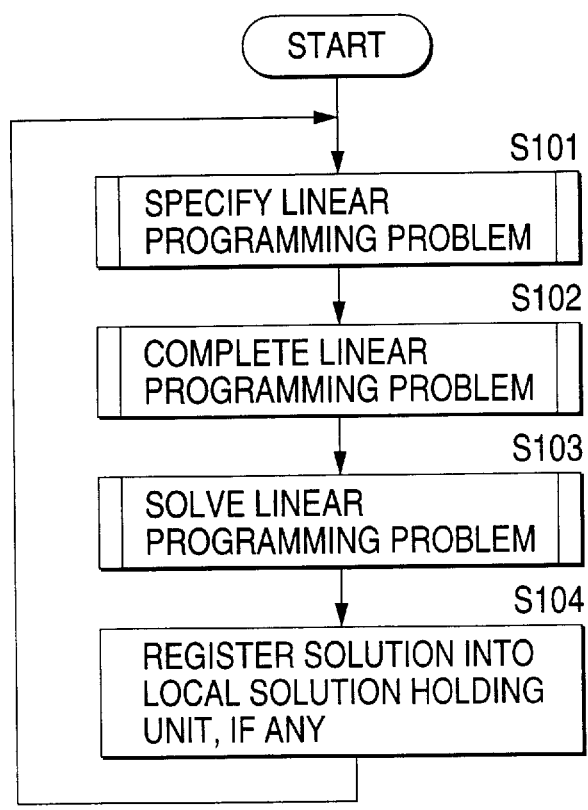
FIG. 16 is a flowchart for denoting an example of a linear programming problem solving process executed in the table allocating apparatus according to the third embodiment of the present invention.

In FIG. 16, there is shown a flowchart for explaining an example of the process operation of the linear programming problem solution by the table allocating apparatus according to the third embodiment of the present invention. At step S101, the linear programming problem managing unit 7 specifies the linear programming problem to be passed to the linear programming problem solution engine unit, namely the $(j_1, \ldots, j_k)$ problem. At step S102, the linear programming problem managing unit 7 completes the selected $(j_1, \ldots, j_k)$ problem as the linear programming problem. At step S103, the linear programming problem solution engine unit 12 solves the given linear programming problem. At step S104, in case that the value returned from the linear programming problem solution engine unit 12 is equal to the minimum values (maximum values) of the objective function and the optimum parameter, after the linear programming problem managing unit 7 has added these values to the local solution holding unit 8 with keeping the correspondence with the linear programming problem, the process operation is returned to step S101 at which the process operation is repeated. In case that the value returned from the linear programming problem solution engine unit 12 reports that the linear programming problem is infeasible, no process operation is infeasible, no process operation is carried out, and then is returned to the previous step S101 at which the predetermined procedure is repeated.

This process operation is repeatedly performed as to all of the $(j_1, \ldots, j_k)$ problem, so that both of the optimum solution and the parameter about the solved problem of $(j_1, \ldots, j_k)$ are stored. The linear programming problem managing unit 7 scans this local solution holding unit 8 to obtain the minimum solution. A layout of a table is determined with employment of the parameter obtained at that time, and is allocated to the texts, so that the desired table can be completed.

Figure 17:
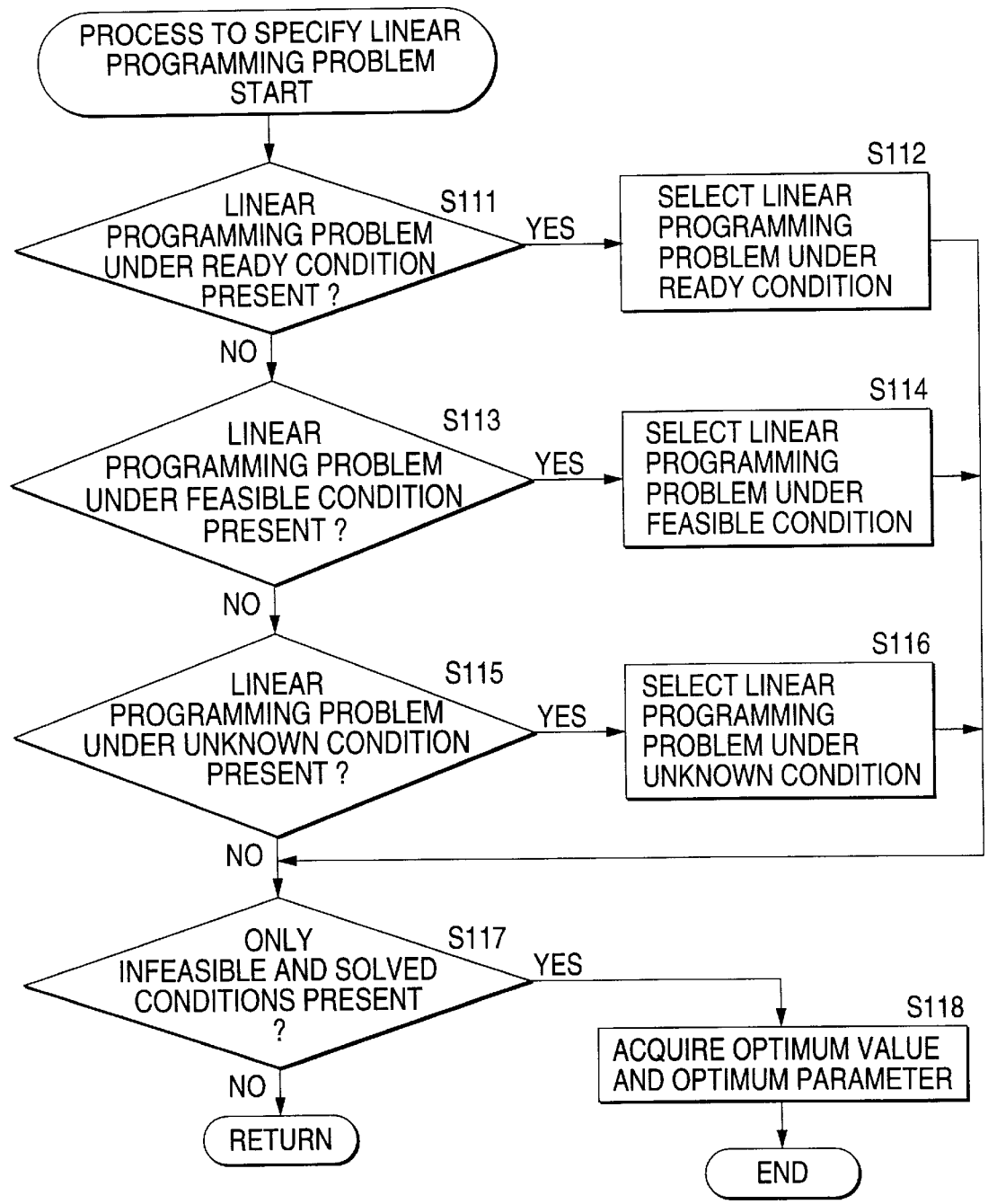
FIG. 17 is a flowchart for representing an example of a specific process for the linear programming problem.

A description will now be made of detailed process operations about the steps defined from S101 to S103. FIG. 17 is a flowchart for representing an example of the specifying process of the linear programming problem. The linear programming problem managing unit 7 specifies the linear programming problem to be passed to the linear programming problem solution engine unit 12 in accordance with the below-mentioned procedure.

At step S111 of this flowchart, when the linear programming problem under READY state is registered into the linear programming problem status holding unit 22, this linear programming problem is acquired at step S112.

At step S113, when no linear programming problem under READY state is registered into the linear programming problem status holding unit 22, if another linear programming problem under FEASIBLE state is registered into the linear programming problem status holding unit 22, then the latter linear programming problem is acquired at step S114.

At step S115, when neither the linear programming problem under READY state, nor the linear programming problem under FEASIBLE state is registered into the linear programming problem status holding unit 22, if another linear programming problem under UNKNOWN state is registered into the linear programming problem status holding unit 22, then the last-mentioned linear programming problem is acquired at step S116.

At step S117, a check is made as to whether or not the statuses of all the linear programming problems, which have been registered into the linear programming problem status holding unit 22, are equal to any one of INFEASIBLE and SOLVED. If YES, then a process operation defined at step S118 is carried out. When at least one of these statuses of the linear programming problem corresponds to any one of READY, FEASIBLE, and UNKNOWN, since the linear programming problem has been selected at step S112, S114, or S116, the process operation for specifying the linear programming problem by the linear programming problem managing unit 7 is ended. Then, the process operation is advanced to another process operation for completing the next linear programming problem.

At step S117, when the statuses of all the linear programming problems, which have been registered into the linear programming problem status holding unit 22, become INFEASIBLE and SOLVED, the linear programming problem managing unit 7 scans the local solution holding unit 8 at step S118. Thus, the linear programming problem managing unit 7 searches either a minimum value, or a maximum value among the minimum values of the registered objective functions, or the maximum values of these registered objective functions. Subsequently, both of the linear programming problem for giving either the searched minimum value, or the searched maximum value, and also the optimum parameter are acquired. Based on this optimum parameter, the layout of the table is formed, and thus the table can be constituted. After this process operation defined at step S118, the overall process operation of the table allocating apparatus according to the present invention is accomplished.

Figure 18:
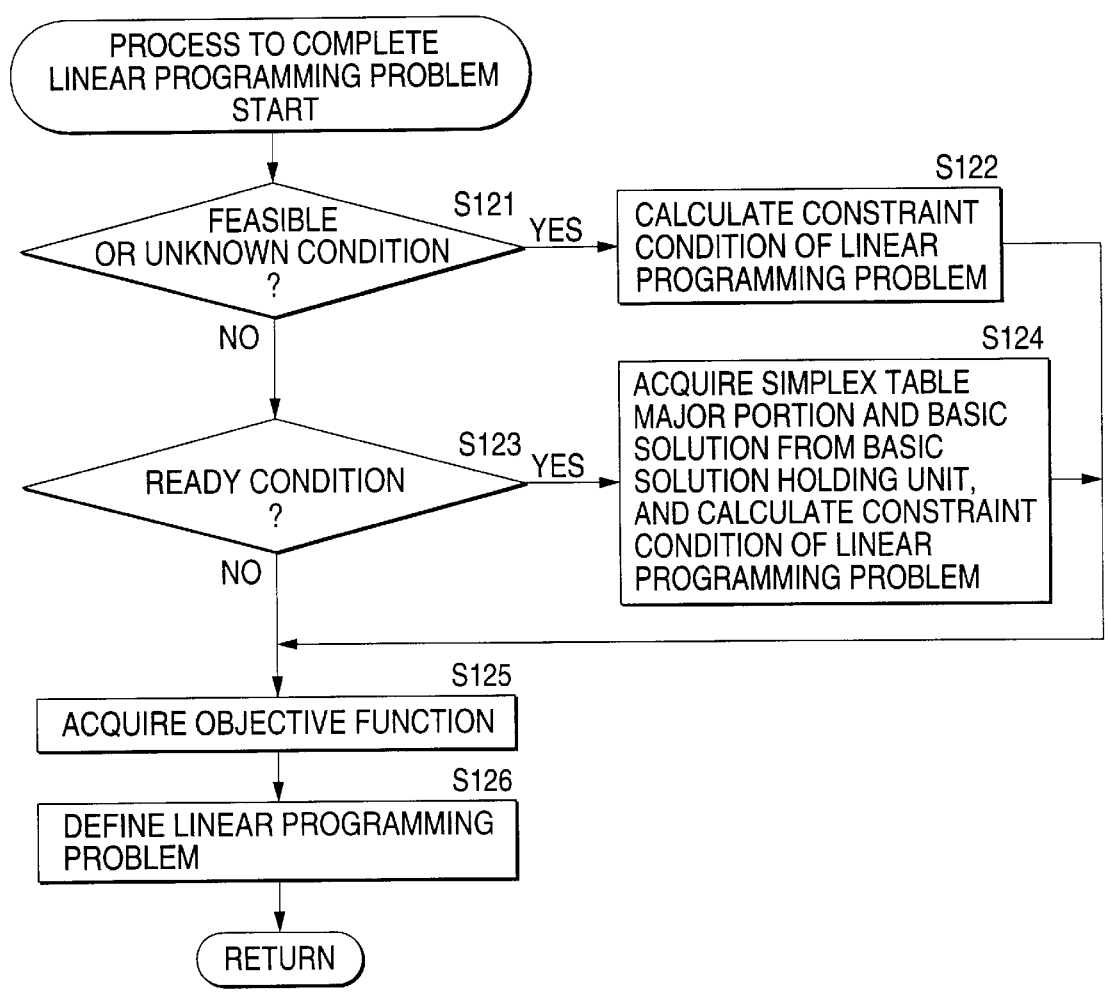
FIG. 18 is a flowchart for showing an example of a process to complete the linear programming problem.

FIG. 18 is a flowchart for indicating one example of the process operation for accomplishing the linear programming problem. The linear programming problem managing unit 7 completes as the linear programming problem, such a linear programming problem selected by the selection process for the linear programming problem, as explained in FIG. 17, namely the $(j_1, \ldots, j_k)$ problem in accordance with the below-mentioned procedure.

At step S121, when the status of the specified $(j_1, \ldots, j_k)$ problem corresponds to any one of FEASIBLE and UNKNOWN, a calculation is performed at step S122 by the section constraint condition holding unit 4, the connector holding unit 2, and the common constraint condition holding unit 3 as to the below-mentioned constraint condition of the linear programming problem belonging to the $(j_1, \ldots, j_k)$ problem:

$$\begin{bmatrix} p_{l,1} & \cdots & p_{1,m} & 1 & 0 & \cdots & \cdots & \cdots & 0 \\ p_{l,1} & \cdots & p_{1,m} & 0 & -1 & 0 & \cdots & \cdots & 0 \\ \vdots & & \vdots & & & & & & \vdots \\ p_{k,1} & \cdots & p_{k,m} & 0 & \cdots & \cdots & 0 & 1 & 0 \\ p_{k,1} & \cdots & p_{k,m} & 0 & \cdots & \cdots & \cdots & 0 & -1 \\ p'_{l,1} & \cdots & p'_{l,m} & 0 & \cdots & \cdots & \cdots & \cdots & 0 \\ \vdots & & \vdots & & & & & & \vdots \\ p'_{k-1,1} & \cdots & p'_{k-1,m} & 0 & & \cdots & \cdots & \cdots & 0 \\ p'_{k,1} & \cdots & p'_{k,m} & 0 & \cdots & \cdots & \cdots & \cdots & 0 \end{bmatrix} \begin{pmatrix} x_1 \\ \vdots \\ x_m \\ y_l \\ z_1 \\ \vdots \\ y_k \\ z_k \end{pmatrix} =$$

$$\begin{pmatrix} s_{1,j_1+1} + d \\ s_{1j_1} + d \\ \vdots \\ s_{k,j_k+1} + d \\ s_{k,j_k} + d \\ s'_1 \\ \vdots \\ s'_k \end{pmatrix} \quad s'_1 \geq 0, \ldots, s'_k \geq 0$$

At step 123, when the status of the specified problem of $(j_1, \ldots, j_k)$ corresponds to READY, both of a simplex table major portion $[_{qi,j}]$ and a basic solution $(\xi_x)$ $(X \in \Omega)$ related to the $(j_1, \ldots, j_k)$ problem are acquired into the linear programming problem basic solution holding unit 19 at step 124. Then, the following constraint condition of the linear programming problem belonging to the $(j_1, \ldots, j_k)$ problem is calculated as follows:

$$\begin{bmatrix} q_{l,1} & \cdots & q_{1,2k+m} \\ \vdots & & \vdots \\ q_{r,1} & \cdots & q_{r,2k+m} \end{bmatrix} \begin{pmatrix} x_1 \\ \vdots \\ x_m \\ y_1 \\ z_1 \\ \vdots \\ y_k \\ z_k \end{pmatrix} = \begin{bmatrix} q_{l,1} & \cdots & q_{1,2k+m} \\ \vdots & & \vdots \\ q_{r,1} & \cdots & q_{r,2k+m} \end{bmatrix} \begin{pmatrix} \xi_{x1} \\ \vdots \\ \xi_{xm} \\ \xi_{y1} \\ \xi_{x1} \\ \vdots \\ \xi_{yk} \\ \xi_{zk} \end{pmatrix} = \begin{pmatrix} b_1 \\ \vdots \\ b_r \end{pmatrix}$$

At step S125, an objective function of the linear programming problem with respect to the $(j_1, \ldots, j_k)$ problem given from the layout evaluation formula calculating unit 10 is obtained. Then, at step S126, such a linear programming problem constructed of the constraint condition and the objective function calculated at step S122, or S124 is defined, and returned to the linear programming problem solution engine unit 12.

Figure 19:
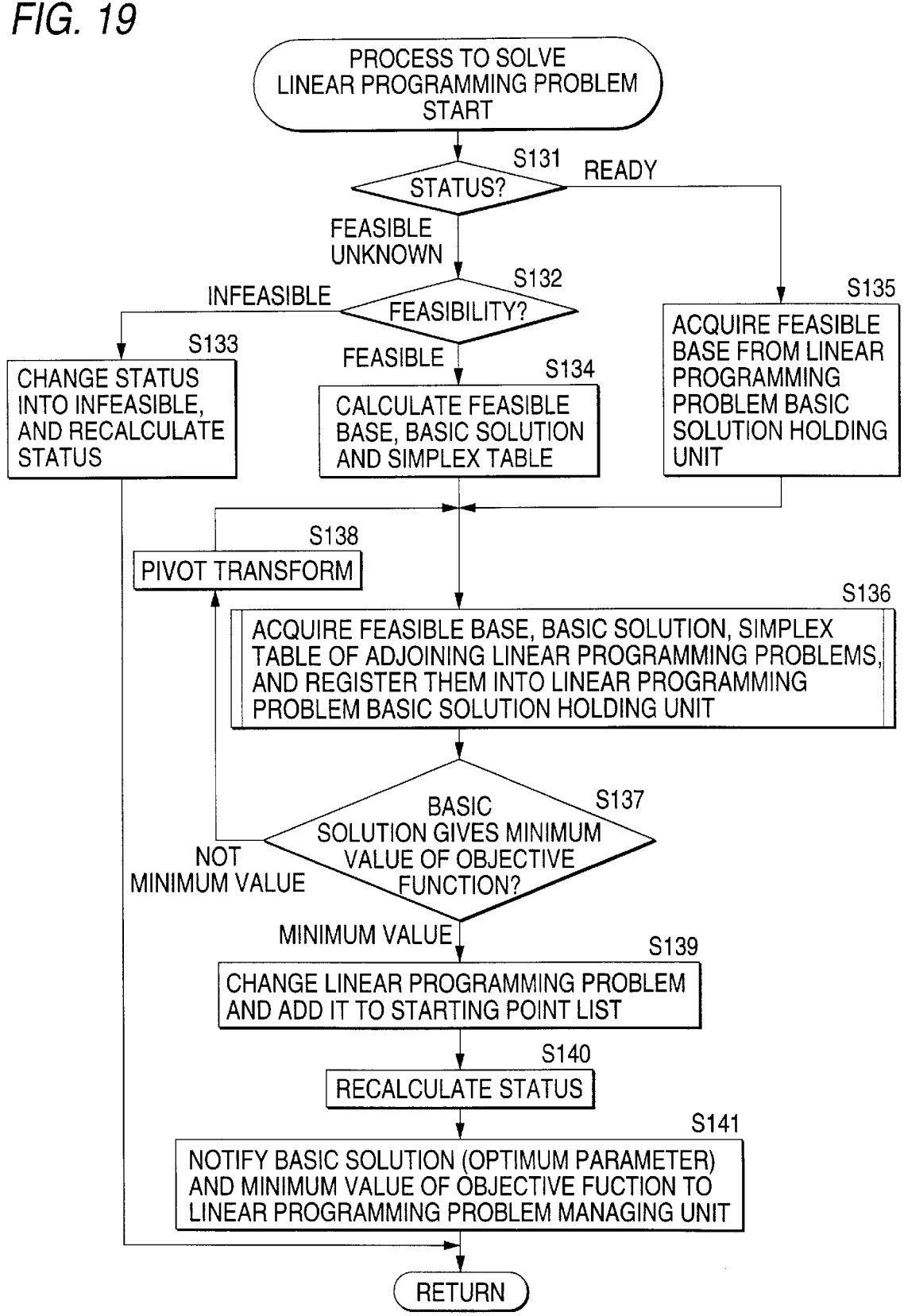
FIG. 19 is a flowchart for showing an example of a process to solve the linear programming problem.

FIG. 19 is a flowchart for explaining an example of the process operation for solving the linear programming problem. The linear programming problem solution engine unit 12 solves the linear programming problem given from the linear programming problem managing unit 7 in accordance with the following procedure.

At step S131 of this flowchart, when the status of the given problem of $(j_1, \ldots, j_k)$ corresponds to any one of FEASIBLE and UNKNOWN, the linear programming problem solving engine unit 12 judges the feasibility of the given linear programming problem with employment of the linear programming at step S132. When it is so judged that the given linear programming problem is infeasible, the status corresponding to the $(j_1, \ldots, j_k)$ problem stored in the linear programming problem status holding unit 22 is changed into INFEASIBLE. Furthermore, after the $(j_1, \ldots, j_k)$ problem is registered into the change starting point list 21, the linear programming problem status calculating unit 20 is called out. The linear programming problem status calculating unit 20 calculates a change in the status of the other linear programming problem for causing the status of the $(j_1, \ldots, j_k)$ problem to be changed. The linear programming problem solution engine unit 12 completes the process operation and returns a control to the linear programming problem managing unit 7.

At step S132, when it is so judge that the linear programming problem is feasible, a calculation is made at step S134 with employment of the sweeping method as to the feasible base (J), the basic solution $(\xi'_x)$ $(X \in \Omega)$, and the simplex table (major portion and non-co-dimensional portion) $[q_{ij|i-1, \ldots, r, j-1, \ldots, 2km}(b_i)_{i-1, \ldots, r}$ belonging to the feasible base. The calculated values are used as the present feasible base, basic solution and simplex table. Then, the process operation is advanced to step S136.

On the other hand, at step S131, when the status of the given problem of $(j_1, \ldots, j_k)$ problem is acquired from the linear programming problem basic solution holding unit 19 at step S135, so that the acquired result is used as the present feasible base, basic solution, and simplex table.

At step S136, the feasible base (J'), basic solution $(\xi'_x)$ $(X \in \Omega)$, and simplex table major portion $[q'_{i,j|i-1, \ldots, r, j-1, \ldots, 2k+m}$ belonging to (j') about the linear programming problems which sandwich the present feasible base and are adjacent to each other are obtained, and then registered into the linear programming problem basic solution holding unit 19. This process operation will be described later with reference to FIG. 20.

At step S137, a judgement is made as to whether or not the present basic solution gives the minimum value of the objective function of the $(j_1, \ldots, j_k)$ problem. If NO, then the process operation is advanced to step S138. At this step, the present simplex table is pivot-transformed to calculated the new feasible base, basic solution, and simplex table, and then the calculated values are employed as the present feasible base, basic solution, and simplex table. Thereafter, the process operation defined at step S136 is repeated.

Now, the method for calculating the feasible base, basic solution, and simplex table, and the judgement of minimum are carried out by way of the methods known as the simplex base I and the simplex base III of the simplex method.

At step S137, when the present basic solution gives the minimum value of the objective function about the $(j_1, \ldots, j_k)$ problem, the $(j_1, \ldots, j_k)$ problem stored in the linear programming problem status holding unit 22 is added to the last portion of the change starting point list 21.

At step S140, the linear programming problem status calculating unit 20 is called so as to calculate a change in the status of other linear programming problem.

At step S141, both of the present basic solution (optimum parameter) and the minimum value of the objective function are reported to the linear programming problem managing unit 7 and a control is returned.

Figure 20:
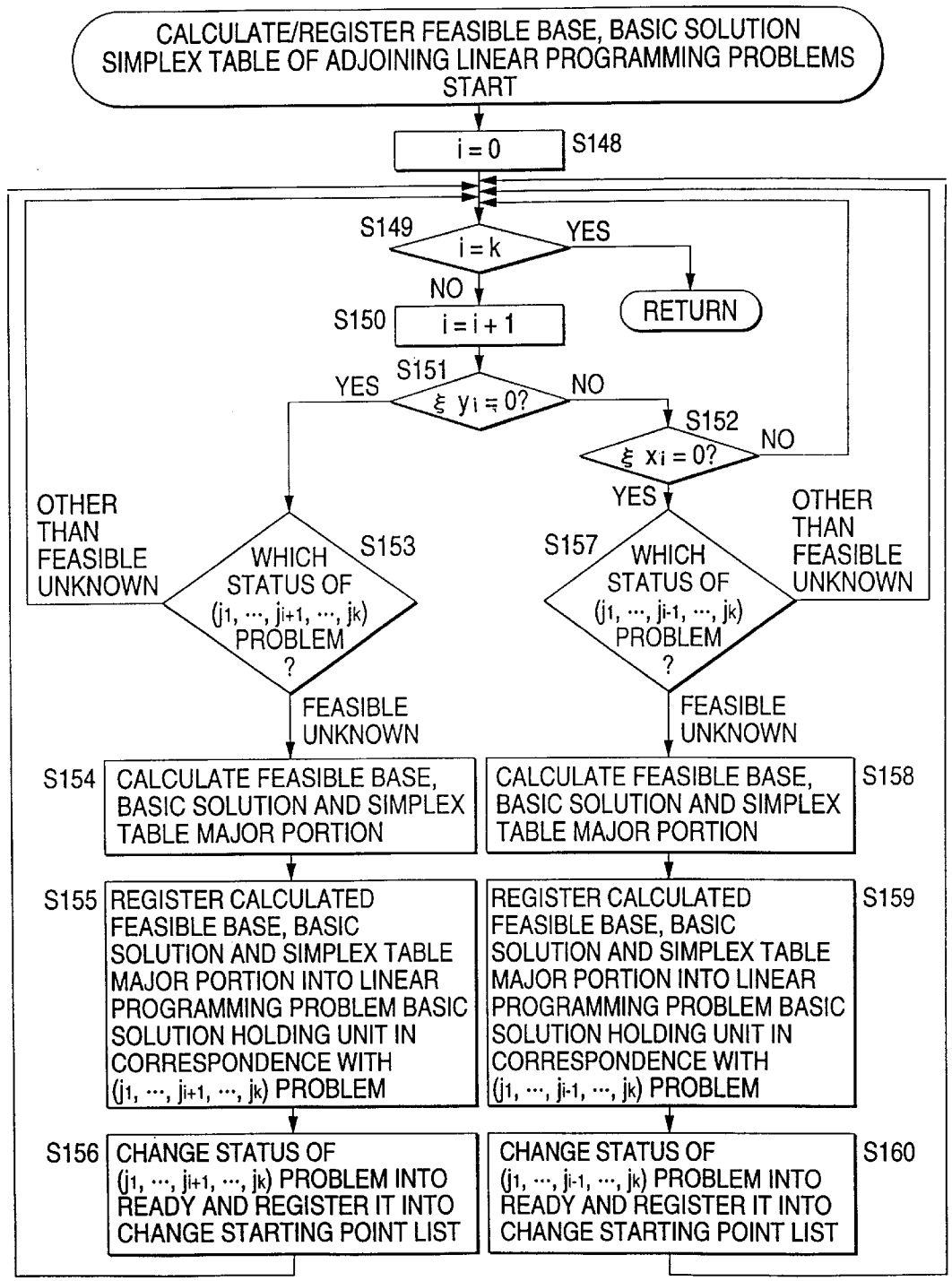
FIG. 20 is a flowchart for representing an example of processes to obtain a feasible base, a basic solution, and a simplex table major portion of the linear programming problems adjacent to each other, while sandwiching the present execution feasible base.

FIG. 20 is a flowchart for explaining one example of a process operation for obtaining a feasible base, a basic solution, and a simplex table major portion of linear programming problems which sandwich the present feasible base and are adjacent to each other. It should be noted that the process operation defined in the above flowchart shown in FIG. 20 is executed as to all of i=1, . . . , k. The process operation performed at step S136 of FIG. 19 is executed in accordance with the following procedure.

At step S151 of this flowchart, a check is done as to whether or not a component $\xi_{y(i)}$ corresponding to a feasible base of $y_i$. If $\xi_{y(i)}=0$, then the process operations defined after step S153 are executed. In other cases, the process operations defined after step S152 are carried out. At step 153, a check is made as to whether or not the status of the $(j_1, \ldots, j_{i-1}, j_i+1, j_{i+1}, \ldots, j_k)$ corresponds to any one of UNKNOWN and FEASIBLE.

When the status corresponds to any one of UNKNOWN and FEASIBLE at step S153, the feasible base (J') the basic solution $(\xi'_x)$ $(X \in \Omega)$, and the simplex table major portion $[q'_{i,j}]_{i-1, r, j-1, \ldots, 2k+m}$ are calculated at step S154 as follows:

$$J' = \begin{cases} J & \text{if } y_i \in J, \\ J \setminus \{z_i\} \cup \{y_i\} & \text{if } y_i \in \Omega \setminus J. \end{cases}$$

$$\xi'x = \begin{cases} s_{i,j_i+2} - s_{i,j_i+1} & \text{if } X = y_i, \\ 0 & \text{if } X = z_i, \\ \xi x & \text{otherwise.} \end{cases}$$

$$[q'_{i,j}] = \begin{cases} [q_{i,j}] & \text{if } y_i \in J, \\ T^{-1}[q_{i,j}]T & \text{if } y_i \in \Omega \setminus J. \end{cases}$$

It should be noted $T^{-1}[q_{i,j}]T$ is the result of pivot transformation where $(z_i, y_i)$ of $[q_{i,j}]$ is used as the axis, namely the result of base transformation related to the new feasible base (J'). When $J=(X_1, \ldots, X_r)$ and $z_1=X_1$, it is calculated by the following transformation matrix:

$$T = \begin{bmatrix} & & & q_{1,y_i} & & & \\ & E_{l-1} & & \cdot & & 0 & \\ & & & \cdot & & & \\ & & & q_{l-1,y_i} & & & \\ 0 & \ldots & 0 & q_{l,y_i} & 0 & \ldots & 0 \\ & & & q_{l+1,y_i} & & & \\ & & & \cdot & & & \\ & 0 & & \cdot & & E_{r-i} & \\ & & & q_{r,y_i} & & & \end{bmatrix}$$

Here, symbol $E_n$ indicates an n-th unit matrix.

At step S155, the feasible base, basic solution, and simplex table major portion, which have been obtained at step S154, are registered into the linear programming problem basic solution holding unit 19 with keeping the correspondence with the $(j_1, \ldots, j_{i-1}, j_i+1, j_{i+1}, \ldots, j_k)$.

At step S148, it is set to i=0. This implies that the count value of the counter is set to the first text. Next, at step S149, a test is made as to whether or not i=k. This implies that a test is done as to whether or not the count value of the counter has reached the last text. If i=k, namely the count value of the counter indicates the final text, then the process operation for the linear programming problems which sandwich the present feasible base and are adjacent to each other is completed, so that the process operation defined at step S136 of FIG. 19 is accomplished. To the contrary, when i=k is not satisfied, the count value of the counter is increment by 1 at step S150, and thereafter a process operation defined after step S151. At step S156, the status of the $(j_1, \ldots, j_{i-1}, j_i+1, j_{i+1}, \ldots, j_k)$ in the linear programming problem status holding unit 22 is changed into READY. Furthermore, when the status of the $(j_1, \ldots, j_{i-1}, j_i+1, j_{i+1}, \ldots, j_k)$ problem, which is before a change, corresponds to UNKNOWN, the $(j_1, \ldots, j_{i-1}, j_i+1, j_{i+1}, \ldots, j_k)$ problem is added to the last portion of the change starting point list 21. Then, the process operation is returned to step S149, and the procedure defined subsequent to step S149 is repeatedly performed.

At step S153, when the status of the $(j_1, \ldots, j_{i-1}, j_i+1, j_{i+1}, \ldots, j_k)$ problem corresponds to any one of UNKNOWN and FEASIBLE, the process operation is returned to the previous step S149, and then the process operations defined after step S149 are repeated.

When $\xi_{y(i)}=0$ is not satisfied at step S151, another check is done as to whether or not $\xi_{z(i)}$ is equal to 0 at step S152. When $\xi_{z(i)}=0$ then the process operations defined after step S157 are executed. In other case, the subsequent "i" is acquired and the same flow operation is repeated.

At step S157, a judgement is made as to whether or not the status of the $(j_1, \ldots, j_{i-1}, j_i-1, j_{i+1}, \ldots, j_k)$ problem corresponds to any one of UNKNOWN and FEASIBLE. When the status of this problem is not any one of UNKNOWN and FEASIBLE, the process operation is returned to step S149, and then the process operations defined after step S149 are repeated.

At step S157, if the status corresponds to any one of UNKNOWN and FEASIBLE, then the process operation is advanced to step S158 at which the following calculation is carried out so as to obtain the feasible base (J'), basic solution $(\xi'_x)$ $(X \in \Omega)$, and simplex table major potion $[q'_{i,j}]_{i-1, \ldots, r, j-1, 2k+m}$:

$$J' = \begin{cases} J & \text{if } z_i \in J, \\ J \setminus \{y_i\} \cup \{z_i\} & \text{if } z_i \in \Omega \setminus J. \end{cases}$$

$$\xi'x = \begin{cases} 0 & \text{if } X = y_i, \\ s_{i,j_i+2} - s_{i,j_i+1} & \text{if } X = z_i, \\ \xi x & \text{otherwise.} \end{cases}$$

$$[q'_{i,j}] = \begin{cases} [q_{i,j}] & \text{if } z_i \in J, \\ T^{-1}[q_{i,j}]T & \text{if } z_i \in \Omega \setminus J. \end{cases}$$

It should be noted that $T^{-1}[q_{i,j}]T$ corresponds to a result of the pivot transformation in which $(y_i, z_i)$ of $[q_{i,j}]$ is used as the axis, namely, a result of base transformation related to the new feasible base (J'). When $J=(X_1, \ldots, X_r)$, $y_i=X_1$, it is calculated by the following transform matrix:

$$T = \begin{bmatrix} & & & q_{1,z_i} & & & \\ & E_{l-1} & & \cdot & & 0 & \\ & & & \cdot & & & \\ & & & q_{l-1,z_i} & & & \\ 0 & \ldots & 0 & q_{l,z_i} & 0 & \ldots & 0 \\ & & & q_{l+1,z_i} & & & \\ & & & \cdot & & & \\ & 0 & & \cdot & & E_{r-i} & \\ & & & q_{r,z_i} & & & \end{bmatrix}$$

At step S159, the acquired feasible base, basic solution, and simplex table major portion are registered not the linear programming problem basic solution holding unit 19 with keeping the $(j_1, \ldots, j_{i-1}, j_i-1, j_{i-1}, \ldots, j_k)$.

At step S160, the status of the $(j_1, \ldots, j_{i-1}, j_i-1, j_{i+1}, \ldots, j_k)$ problem stored in the linear programming problem status holding unit 22 is changed into READY. Moreover, when the status of the $(j_1, \ldots, j_{i-1}, j_i-1, j_{i+1}, \ldots, j_k)$ problem, which is before a change, corresponds to UNKNOWN, the $(j_1, \ldots, j_{i-1}, j_i-1, j_{i+1}, \ldots, j_k)$ problem is added to the last portion of the change starting point list 21. Then, the process operation is returned to step S149 at which the procedure defined subsequent to step S149 is repeatedly performed.

Figure 21:
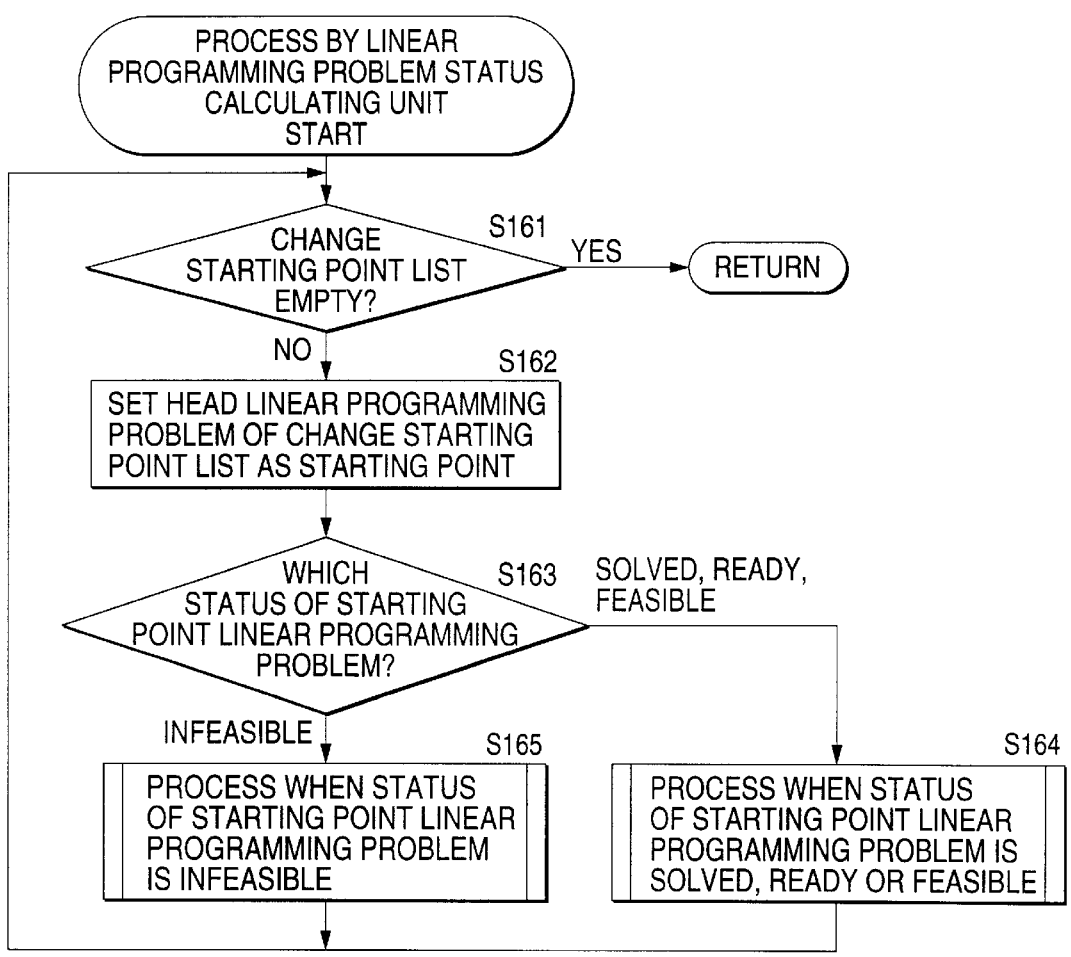
FIG. 21 is a flowchart for indication an example of operation of a linear programming problem status calculating unit.

FIG. 21 is a flowchart for indicating an example of the operation performed by the linear programming problem status calculating unit 20. When the linear programming problem status calculating unit 20 is initiated by the linear programming problem solution engine unit 12, the process operation is carried out in accordance with the following procedure.

At step S161 of this flowchart, if the change starting point list 21 is empty, then the process operation is ended, and a control is returned to the linear programming problem solution engine unit 12. When the change starting point list 21 is not empty, the process operation is advanced to step S162 at which the linear programming problem present at a top position of the change starting point list 21 is removed, and then a change of the subsequent statuses is executed while the removed linear programming problem is used as a starting point.

At step S163, a judgement is made as to whether or not the status of the starting point linear programming problem (for example, $(j_1, \ldots, j_k)$ problem) corresponds to any one of "SOLVED", "READY" and "FEASIBLE". If YES, then a process operation defined at step S164 is carried out. When this status corresponds to INFEASIBLE, a process operation of step S165 is carried out, and thereafter the process operation is returned to step S161.

Figure 22:
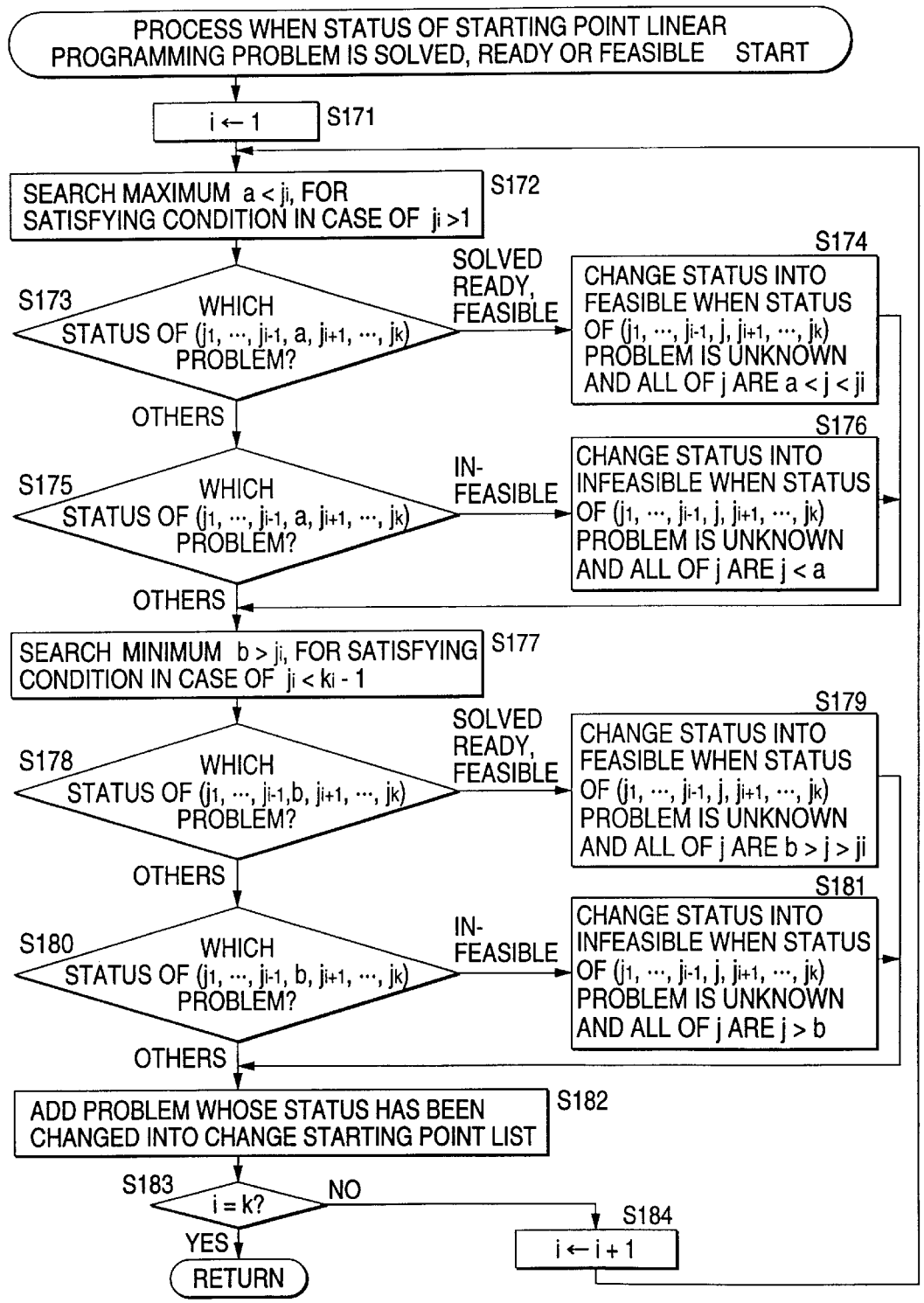
FIG. 22 is a flowchart for denoting an example of operation of the linear programming problem status calculating unit in case that a status of the starting-point linear programming problem is one of statuses "SOLVED", "READY" and "FEASIBLE"

FIG. 22 is a flowchart for indicating an example of the operation of the linear programming problem status calculating unit in case that the status of the starting point linear programming problem corresponds to any one of SOLVED, READY and FEASIBLE. This process operation corresponds to such a process operation for propagating this status to the adjoining linear programming problems when the starting point linear programming problem is at least feasible. As the initial setting operation, the index "i" is set to 1 at step S171.

At step S172, when $j_i > 1$, a search is made of a maximum value of a $<j_i$ for satisfying any one of the following conditions:

(1) The status of the $(j_1, \ldots, j_{i-1}, a, j_{i+1}, \ldots, j_k)$ problem corresponds to any one of SOLVED, READY, and FEASIBLE.

(2) The status of the $(j_1, \ldots, j_{i-1}, a, j_{i+1}, \ldots, j_k)$ problem is INFEASIBLE.

(3) a=1.

At step S173, when the "a" searched at step S172 satisfies the above-described "(1) the status of $(j_1, \ldots, j_{i-1}, a, j_{i+1}, \ldots, j_k)$ problem corresponds to any one of SOLVED READY, and FEASIBLE", the process operation is advanced to step S174. At step S174, as to "j" for satisfying $a<j<j_i$, if the status of the $(j_1, \ldots, j_{i-1}, j, j_{i+1}, \ldots, j_k)$ problem is equal to UNKNOWN, such an operation for changing the status into FEASIBLE is carried out.

At step 175, when the "a" searched at step S172 satisfies the above-described condition "(2) the status of the $(j_1, \ldots, j_{i-1}, a, j_{i+1}, \ldots, j_k)$ problem is INFEASIBLE", the process operation is advanced to step S176. At step S176, when the status of the $(j_1, \ldots, j_{i-1}, j, j_{i+1}, \ldots, j_k)$ problem is UNKNOWN as to all of "j" for satisfying the condition of j<a, such an operation for changing the status into INFEASIBLE is performed.

At step S177, when $j_i < k_i - 1$, a search is made of a minimum of $b > j_i$ for satisfying any one of the following conditions:

(1) The status of the $(j_1, \ldots, j_{i-1}, b, j_{i+1}, \ldots, j_k)$ problem corresponds to any one of SOLVED, READY, and FEASIBLE.

(2) The status of the $(j_1, \ldots, j_{i-1}, b, j_{i+1}, \ldots, j_k)$ problem corresponds to INFEASIBLE.

(3) b=k&hd i−1.

At step S178, when the "b" searched at step S177 satisfies the above-explained condition "(1) the status of the $(j_1, \ldots, j_{i-1}, b, j_{i+1}, \ldots, j_k)$ problem corresponds to any one of SOLVED, READY, and FEASIBLE", the process operation is advanced to step S179. At step S179, if the status of the $(j_1, \ldots, j_{i-1}, j, j_{i+1}, \ldots, j_k)$ problem is UNKNOWN as to all of "j" for satisfying the condition of $b>j>j_i$, then such an operation for changing this status into FEASIBLE is carried out.

At step S180, when the "b" searched at step S177 satisfies the above-described condition "(2) the status of the $(j_1, \ldots, j_{i-1}, b, j_{i+1}, \ldots, j_k)$ problem is INFEASIBLE", the process operation is advanced to step S181. At step S181, when the status of the $(j_1, \ldots, j_{i-1}, j, j_{i+1}, \ldots, j_k)$ problem is UNKNOWN as to all of "j" for satisfying j>b, such an operation for changing the status into INFEASIBLE is performed.

At step S182, all of the linear programming problems whose statuses have been changed at the process operations defined from step S171 to step S181 are added to the last portion of the change starting point list 21.

At step S183, a check is done as to whether or not the index "i" is the last index, namely i=k. If YES, then, the process operation defined at step S164 of FIG. 21 is ended. If i<k, then the index "i" is increased at step S184, and the process operations defined after step S172 are repeated.

Figure 23:
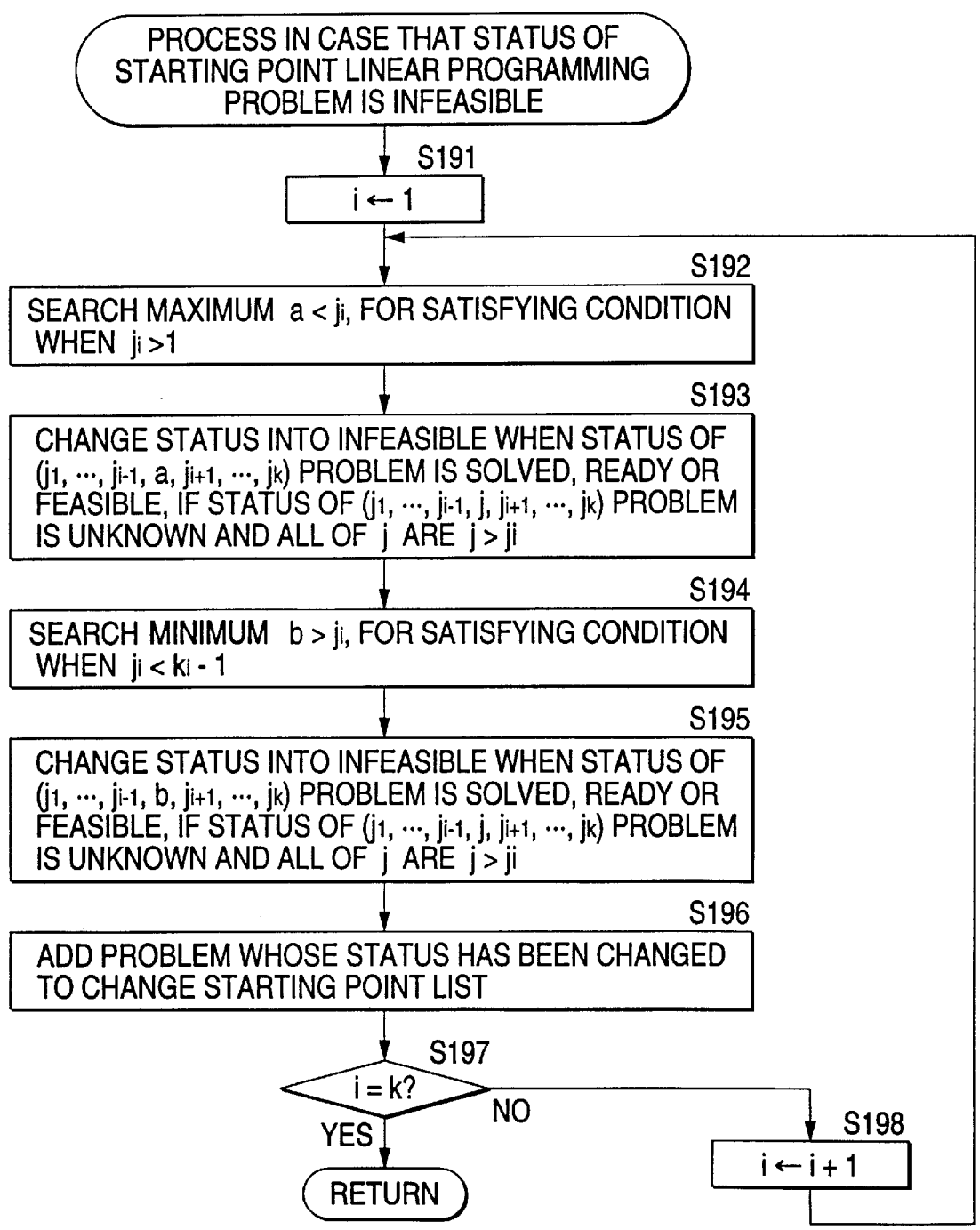
FIG. 23 is a flowchart for showing an example of operation of the linear programming problem status calculating unit in case that a status of the starting-point linear programming problem is "INFEASIBLE".

FIG. 23 is a flowchart for showing an example of the operation of the linear programming problem status calculating unit when the status of the starting point linear programming problem is INFEASIBLE. This process operation is such a process operation for propagating such a status to the adjoining linear programming problems that the starting point linear programming problem is infeasible. As the initial setting, "1" is set to index "i" at step S191.

At step S192 of this flowchart, when $J_i > 1$, a search is done as to the maximum $a<j_i$ for satisfying any one of the below-mentioned conditions:

(1) The status of the $(j_1, \ldots, j_{i-1}, a, j_{i+1}, \ldots, j_k)$ problem corresponds to any one of SOLVED, READ, and FEASIBLE.

(2) a=1.

At step S193, when the "a" searched at step S192 satisfies the above-described condition "(1) the status of the $(j_1, \ldots, j_{i-1}, a, j_{i+1}, \ldots, j_k)$ problem corresponds to any one of SOLVED, READY and FEASIBLE", if the status of the $(J_1, \ldots, j_{i-1}, j, j_{i+1}, \ldots, j_k)$ problem is equal to UNKNOWN as to all of the "j" for satisfying $j>j_i$, then such an operation for changing this status into INFEASIBLE is carried out.

At step S194 a search is made of such a minimum $b>j_i$ for satisfying any one of the following conditions when $j_i<k_i-1$.

(1) The status of the $(j_1, \ldots, j_{i-1}, b, j_{i+1}, \ldots, j_k)$ problem corresponds to any one of SOLVED, READY, and FEASIBLE.

(2) $b=k_i-1$.

At step S195, when the "b" searched at step S194 satisfies the above-described condition "(1) the status of the $(j_1, \ldots, j_{i-1}, b, j_{i+1}, \ldots, j_k)$ problem satisfies any one of SOLVED, READY and FEASIBLE", if the status of the $(j_1, \ldots, j_{i-1}, j, j_{i+1}, \ldots, j_k)$ problem is UNKNOWN as to all of "j" for satisfying the condition of $j<j_i$, then such an operation for changing the status into INFEASIBLE is performed.

At step S196, all of the linear programming problems whose statuses have been changed at steps S191 to S195 are added to the last portion of the change starting point list 21.

At step S197, a check is done as to whether or not the index "i" corresponds to the last index, namely where or not i=k. If YES, then the process operation defined at step S165 of FIG. 21 is ended. If i<k, then the index "i" is incremented by 1 at step S198, and the process operation is returned to step S192 at which the process operation for the next "i" is repeated.

In accordance with the above-described process operations, since the linear programming problem whose status is INFEASIBLE is excluded from the linear programming managing unit 7, a total number of problems can be reduced to which the linear programming is applied. Furthermore, when the status is READY, since the feasible base, basic solution, and simplex table major portion, which have been registered in the linear programming problem basic solution holding unit 19, are employed, these calculations can be omitted. As described above, a portion of the process operation about the linear programming is omitted, so that the process speed by the table allocating apparatus can be increased.

As apparent from the above-described explanations, in the table allocating apparatus according to the present invention, while the automatic determinations of the intervals (row heights and column widths) of the horizontal/vertical ruled lines for the table can be realized in combination with the automatic line folding operation of the texts in the item columns, such a table capable of satisfying the optimum layout standardization can be produced. In other words, the user need no longer designate the row heights and the column widths taking account of the text appearing on the table. The table allocating apparatus according to the present invention automatically performs the proper line folding operation of the text and also automatically calculates the proper column width and proper row height in accordance with the amount of the text allocated to the respective item columns in the table, so that such a table with a layout capable of satisfying the optimum layout evaluation basis can be formed which is predetermined with respect to the overall table.

What is claimed is:

1. A table layout apparatus for providing a layout of a table having rows and columns, comprising:

text holding means for holding at least one text to be laid out within the table;

connector holding means for holding at least one linear function with respect to parameters, each linear function being associated with a column of the table and representing a width of the column;

sectional constraint holding means for holding a sectional constraint for each text held by the text holding means, the sectional constraint including at least one linear inequality for which values for the parameters should satisfy in order that a height of a layout box, which is a rectangular area for laying out the text, remains constant;

layout evaluation means for receiving the height of the layout box and for calculating a target function in accordance with the received height of the layout box and the at least one linear function held by the connector holding means, the target function being linear with respect to the width of the columns of the table;

linear programming problem solution engine means for receiving the sectional constraint and, under the received sectional constraint, for finding optimal solutions for the parameter that yield a minimum/maximum value for the target function calculated by the layout evaluation means by solving a linear programming problem determined by the target function and the sectional constraint; and linear programming problem managing means for finding optimal solutions for the parameters by repeating the following steps until at least one optimal solution is found:

selecting a sectional constraint held by the sectional constraint holding means;

inputting the selected sectional constraint to the linear programming problem solution engine means; and receiving an output from the linear programming problem solution engine means, wherein the output is a pair of the optimal solutions for the parameters under the condition of the inputted sectional constraint and the value of the target function.

2. The table layout apparatus as claimed in claim 1, further comprising generic constraint holding means for holding a generic constraint, which is at least one linear inequality for which the values of the parameters always satisfy, and wherein the linear programming problem solution engine means attempts to find optimal solutions within a range determined by the generic constraint held by the generic constraint holding means in addition to the given sectional constraint.

3. The table layout apparatus as claimed in claim 1, further comprising:

text classifying means for grouping the texts held by the text holding means into at least one text class such that every text belonging to a particular text class shares a common homogeneous part of the linear function with respect to the parameters, wherein the common homogeneous part of the linear function represents a width of a layout box of the text and is determined from the linear functions held by the connector holding means, and wherein the sectional condition holding means calculates and holds a sectional constraint for each text class.

4. The table layout apparatus as claimed in claim 1, wherein the linear programming problem solution engine means calculates a simplex table for each of the linear programming problems, the table layout apparatus further comprising:

shared part holding means for holding the shared part of a plurality of simplex tables which the linear programming problem solution engine means registers when the linear problem solution engine means calculates a simplex table at first, and in commencing to solve a new given linear programming problem, the linear programming problem solution means uses a shared part to complete a simple table.

5. The table layout apparatus as claimed in claim 1, wherein the target function calculated by said layout evaluation means corresponds to a formula based upon a summation of areas of the space regions after the text has been allocated to the item column in the table.

6. The table layout apparatus as claimed in claim 1, further comprising linear programming problem status holding means for holding a status to indicate that a feasibility of each of the linear programming problems is at least "feasible", "infeasible", or "unknown", and linear programming problem status calculating means for updating the status held in said linear programming problem status holding means as to a plurality of linear programming problems every time said linear programming problem status holding means judges the feasibility of each linear programming problem, wherein at least a linear programming problem having a status of "infeasible" is not processed.

7. The table layout apparatus as claimed in claim 6, wherein the statuses held in said linear programming problem status holding means include priority orders, and said linear programming problem managing means includes linear programming problem selecting means for determining an order along which the linear programming problems are solved based on the priority order of said status.

8. The table layout apparatus as claimed in claim 1, wherein the linear programming problem solution engine means includes adjoining basic feasible solution calculating means and adjoining basic feasible solution holding means, wherein, whenever the linear programming problem solution engine means calculates a combination of a feasible base and an associated basic feasible solution, the adjoining basic feasible solution calculating means calculates the combination of the feasible base and the associated basic feasible solution for each of the other linear programming problems that are adjacent to the linear programming problem for which the linear programming problem solution engine means has processed, and wherein the adjoining basic feasible solution holding means holds the combination of the feasible base and the associated basic feasible solution that the adjoining basic feasible solution holding means calculates, and in commencing to solve a new linear programming problem, the linear programming problem solution engine means retrieves a combination of a feasible base and an associated basic feasible solution, if present, from the adjoining basic feasible solution holding means and then uses it as the initial combination of the feasible base and the basic feasible solution.

9. The table layout apparatus as claimed in claim 8, further comprising:

linear programming problem status holding means for holding a status to indicate that a feasibility of each of the linear programming problems is at least one of "solved", "basic solution being held", "feasible", "infeasible", and "unknown"; and linear programming problem status calculating means for updating the status held in said linear programming problem status holding means as to a plurality of linear programming problems every time said linear programming problem status holding means judges the feasibility of each linear programming problem, wherein at least a linear programming problem having a status of "infeasible" is not processed, and a linear programming problem having a status of "basic solution being held" is solved by employing the feasible base and the basic solution, which correspond to the linear programming problem and are held in said adjoining basic feasible solution holding means.

10. A table layout method for producing a layout of a table having rows and columns, comprising the steps of:

setting at least one text to be laid out within the table;

setting at least one linear function with respect to parameters, wherein each linear function is associated with a column of the table and represents a width of the column;

setting a sectional constraint for each text, the sectional constraint including at least one linear inequality for which values for the parameters should satisfy in order that a height of a layout box, which is a rectangular area in the table for laying out the text, remains constant;

finding optimal solutions for the parameters by repeating the following steps until at least one optimal solution is found;

selecting one of the sectional constraints;

calculating a target function for the selected sectional constraint in accordance with the height of the layout box and the at least one linear function, the target function being linear with respect to the width of the columns of the table; and under the selected sectional constraint, finding optimal solutions for the parameters which yield a minimum/maximum value for the target function by solving a linear programming problem determined by the selected sectional constraint and the calculated target function.

* * * * *